(12) United States Patent
Prengaman et al.

(10) Patent No.: US 11,522,190 B2
(45) Date of Patent: *Dec. 6, 2022

(54) LEAD-BASED ALLOY AND RELATED PROCESSES AND PRODUCTS

(71) Applicant: RSR Technologies, Inc, Dallas, TX (US)

(72) Inventors: R. David Prengaman, Dallas, TX (US); Timothy W. Ellis, Dallas, TX (US); Matthew T. Raiford, Dallas, TX (US)

(73) Assignee: RSR Technologies, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/194,470

(22) Filed: Mar. 8, 2021

(65) Prior Publication Data

US 2021/0226212 A1 Jul. 22, 2021

Related U.S. Application Data

(60) Continuation of application No. 16/689,415, filed on Nov. 20, 2019, now Pat. No. 10,950,859, which is a
(Continued)

(51) Int. Cl.
*H01M 4/57* (2006.01)
*H01M 4/38* (2006.01)
(Continued)

(52) U.S. Cl.
CPC ............... *H01M 4/57* (2013.01); *B22F 9/04* (2013.01); *B22F 9/082* (2013.01); *B22F 9/16* (2013.01);
(Continued)

(58) Field of Classification Search
CPC ............ H01M 4/0404; H01M 4/0445; H01M 4/0447; H01M 4/0471; H01M 4/14; H01M 4/20; H01M 4/21; H01M 4/38; H01M 4/56; H01M 4/57; H01M 4/662; H01M 4/73; H01M 2004/027; H01M 2004/028;
(Continued)

(56) References Cited

U.S. PATENT DOCUMENTS 4,594,301 A 6/1986 Miyazaki
5,352,549 A 10/1994 Rao
(Continued)

FOREIGN PATENT DOCUMENTS

CN 102938465 A1 2/2013
JP 60000060 A1 1/1985
(Continued)

OTHER PUBLICATIONS

English translation of JP Publication H09283137, Oct. 1997.*
(Continued)

*Primary Examiner* — Brittany L Raymond
(74) *Attorney, Agent, or Firm* — Baker Botts, LLP

(57) ABSTRACT

A lead-based alloy containing alloying additions of bismuth, antimony, arsenic, and tin is used for the production of doped leady oxides, lead-acid battery active materials, lead-acid battery electrodes, and lead-acid batteries.

18 Claims, 18 Drawing Sheets

Related U.S. Application Data division of application No. 15/495,803, filed on Apr. 24, 2017, now Pat. No. 10,511,022.

(60) Provisional application No. 62/328,150, filed on Apr. 27, 2016.

(51) Int. Cl.

| | | |
|---|---|---|
| H01M 4/04 | (2006.01) | |
| H01M 4/56 | (2006.01) | |
| H01M 4/20 | (2006.01) | |
| C22C 11/00 | (2006.01) | |
| H01M 4/14 | (2006.01) | |
| B22F 9/04 | (2006.01) | |
| B22F 9/08 | (2006.01) | |
| B22F 9/16 | (2006.01) | |
| C01B 35/12 | (2006.01) | |
| C01G 29/00 | (2006.01) | |
| C22C 11/10 | (2006.01) | |
| H01M 4/21 | (2006.01) | |
| H01M 4/66 | (2006.01) | |
| H01M 4/73 | (2006.01) | |
| H01M 10/08 | (2006.01) | |
| H01M 4/02 | (2006.01) | |

(52) U.S. Cl.
CPC .......... *C01B 35/128* (2013.01); *C01G 29/006* (2013.01); *C22C 11/00* (2013.01); *C22C 11/10* (2013.01); *H01M 4/0404* (2013.01); *H01M 4/0445* (2013.01); *H01M 4/0447* (2013.01); *H01M 4/0471* (2013.01); *H01M 4/14* (2013.01); *H01M 4/20* (2013.01); *H01M 4/21* (2013.01); *H01M 4/38* (2013.01); *H01M 4/56* (2013.01); *H01M 4/662* (2013.01); *H01M 4/73* (2013.01); *H01M 10/08* (2013.01); *B22F 2009/043* (2013.01); *B22F 2009/086* (2013.01); *B22F 2009/0848* (2013.01); *B22F 2301/30* (2013.01); *B22F 2302/25* (2013.01); *B22F 2998/10* (2013.01); *C01P 2006/40* (2013.01); *H01M 2004/027* (2013.01); *H01M 2004/028* (2013.01); *H01M 2220/20* (2013.01); *H01M 2300/0011* (2013.01)

(58) Field of Classification Search
CPC ...... H01M 2220/20; H01M 2300/0011; Y02E 60/10; B22F 9/04; B22F 9/082; B22F 9/16; B22F 2009/043; B22F 2009/0848; B22F 2009/086; B22F 2301/30; B22F 2302/25; B22F 2998/10; C01G 29/006; C01P 2006/40; C22C 11/00; C22C 11/10
See application file for complete search history.

(56) References Cited

U.S. PATENT DOCUMENTS

| | | |
|---|---|---|
| 6,284,411 B1 | 9/2001 | Shiomi |
| 7,597,998 B2 | 10/2009 | Sugie |
| 8,771,871 B2 | 7/2014 | Furukawa |
| 2004/0091777 A1* | 5/2004 | Lam .................. H01M 4/38 429/225 |
| 2006/0039852 A1 | 2/2006 | Trischan |
| 2007/0141465 A1 | 6/2007 | Honbo |
| 2010/0075231 A1 | 3/2010 | Armstrong |
| 2017/0317351 A1 | 11/2017 | Prengaman |

FOREIGN PATENT DOCUMENTS

| | | | |
|---|---|---|---|
| JP | 04505827 A1 | 5/1990 | |
| JP | H09283137 | * 10/1997 | |
| JP | 3-876931 B2 | 2/2007 | |
| JP | 2007-172999 A1 | 7/2007 | |
| JP | 2008-210685 A1 | 9/2008 | |
| JP | 2010-520607 A1 | 6/2010 | |
| RU | 2233510 C2 | 7/2004 | |
| RU | 2342744 C1 | 12/2008 | |
| WO | 90/14693 A2 | 11/1990 | |
| WO | 2005/094501 A2 | 2/2005 | |
| WO | 2008/109429 A2 | 9/2008 | |

OTHER PUBLICATIONS

Notice of Allowance; JP Patent Appln No. 2018-556502.
Chen et al, "Tt;e effect and mectianism of bismuth doped lead oxide on tt;e peiforrnance of lead-acid batteries", Journal of Power Sources, 95, 2001, P._§ges 1 os-1•18.
Dix. J.E., "A Comparison of Barton-Pot and Ball—Mill Processes for Makin[I Leady Oxide", Journal of Power Sources, 19, 1987, P-!c!_fles 157-161.
Giess, H.K., "Effect of Antimony on the Morphology of Lead Oxide", Abstract No. 54, The Electrochemical Society, Inc., Los Angeles, California, Oct. 14, 1979, 2 pages.
Hofmann, W., "Lead and Lead Alloys, Properties and Technology", Springer-Verlag, New York, 1970, p. 331.
Hullmeine et al., "Effect of Previous Charge/Discharge History on the Capacity of tt;e Pb02/PbSO. Electrode: The Hysteresis or Memory Effect", Journal of Power Sources, 25, 1989, pp. 27-47.
Lam et al., "Capacity and cycle-life of batteries using bismuth-hearing oxide", Journal of Power Sources, 78, 1999, pp. 139-146.
Pavlov, D., "Effect of dopants (Group Va) on the performance of the positive leadiacid battery plate", Journal of Power Sources, 33, 991. pp. 221-229.
Stevenson et al., "VRLA Refined TM lead—A must for VRLA batteries Specification and Performance", , Journal of Power Sources, 95, 2001, pp. 264-270.
Winsel et al , The Aggregate-of-Spheres (Kugelhaufen) Model of the Pb02/PbS04 Electrode•, Journal of Power Sources, 30, 1990, pp. 209-226.
International Search Report and Writlen Opinion for International Application No. PCT/US2017/029559 dated Jun. 23, 2017.
International Preliminary Report on Patentatiility for International J-\pplicalion No. PCT/US2017 i029559 dated Oct. 30, 2018.
Intellectual Property India, Indian Office Action, Application No. 201827044461; Oct. 19, 2020.
Office Action; EP Patent Appln No. 17721945.8; dated May 4, 2022.

* cited by examiner

LEAD-BASED ALLOY AND RELATED PROCESSES AND PRODUCTS

CROSS-REFERENCE TO RELATED APPLICATIONS

This application is a continuation, under 35 U.S.C. § 120 of U.S. patent application Ser. No. 16/689,415 filed on Nov. 20, 2019 which is divisional application filed under 35 U.S.C. § 120 to U.S. patent application Ser. No. 15/495,803, entitled LEAD-BASED ALLOY AND RELATED PROCESSES AND PRODUCTS, filed Apr. 24, 2017, which application is related to and claims the benefit of priority to U.S. Provisional Patent Application No. 62/328,150, entitled LEAD-BASED ALLOY AND RELATED PROCESSES AND PRODUCTS, filed on Apr. 27, 2016. Disclosures of each of the forgoing applications are incorporated herein by reference in their entirety.

BACKGROUND

The information described in this background section is not admitted to be prior art.

Lead-acid batteries produce electricity through the reversible oxidation and reduction of metallic lead and lead dioxide electrodes in ionic contact through an aqueous sulfuric acid-based electrolyte and electrical contact through an external circuit. During battery discharge, metallic lead ($Pb°$) reacts with hydrogen sulfate (bisulfate) anion ($HSO_4^-$) and is oxidized to lead sulfate ($PbSO_4$), thereby releasing hydrogen cations ($H^+$) into the electrolyte and electrons to the external circuit. The lead oxidation half-reaction occurs during battery discharge at negative electrodes (anodes) comprising the metallic lead. During battery discharge, lead dioxide ($PbO_2$) reacts with hydrogen sulfate (bisulfate) anion ($HSO_4^-$), hydrogen cations ($H^+$), and electrons from the external circuit, and the lead dioxide is reduced to lead sulfate ($PbSO_4$). The lead dioxide reduction half-reaction occurs during battery discharge at positive electrodes (cathodes) comprising the lead dioxide. Similarly, during battery charge/recharge, the lead sulfate in the anode is reduced to metallic lead, and the lead sulfate in the cathode is oxidized to lead dioxide. The oxidation-reduction reactions that occur at the cathode and anode during battery charge/recharge are driven with energy provided by a voltage/current supply connected through the external circuit.

The performance parameters of lead-acid batteries (e.g., capacity and cycle-life) are largely dependent upon the chemical composition of the constituent materials comprising the electrodes and electrolyte. For example, the charge/discharge/recharge histories of lead-acid batteries affect the capacities and cycle-lives of the batteries, and the effects are quantifiably different between batteries having constituent active materials with different chemical compositions. Additionally, the major aging processes that lead to gradual loss of performance in lead-acid batteries—e.g., anodic corrosion of system components, positive active material degradation and loss of adherence/coherence, and irreversible formation of lead sulfate in the active material (crystallization, sulfation)—are also largely dependent upon the chemical composition of the constituent materials comprising the electrodes and electrolyte.

Accordingly, improved lead-acid battery performance can be achieved through the use of enhanced materials for the production of lead-acid battery components. Consequently, improved materials for the production of lead-acid battery components would be beneficial.

SUMMARY

This specification describes lead-based alloys useful for the production of doped leady oxides, electrode active materials, electrodes, and lead-acid batteries. This specification also describes processes for the production of doped leady oxides, electrode active materials, electrodes, and lead-acid batteries. This specification also describes doped leady oxides, electrode active materials, electrodes, and lead-acid batteries.

In one example, a lead-based alloy comprises, in percent by total alloy weight: 0.0030% to 0.0900% bismuth; 0.0010% to 0.0300% antimony; 0.0010% to 0.0300% arsenic; and 0.0010% to 0.0100% tin.

In another example, a process for the production of doped leady oxide comprises charging lead-based alloy ingots into a ball mill, wherein the lead-based alloy comprises, in percent by total alloy weight: 0.0030% to 0.0900% bismuth; 0.0010% to 0.0300% antimony; 0.0010% to 0.0300% arsenic; and 0.0010% to 0.0100% tin; milling the lead-based alloy ingots in air; oxidizing the lead-based alloy during the milling to form doped leady oxide; and forming powder particles of the doped leady oxide during the milling.

In another example, a process for the production of doped leady oxide comprises melting a lead-based alloy, wherein the lead-based alloy comprises, in percent by total alloy weight: 0.0030% to 0.0900% bismuth; 0.0010% to 0.0300% antimony; 0.0010% to 0.0300% arsenic; and 0.0010% to 0.0100% tin; atomizing the molten lead-based alloy to form molten lead-based alloy droplets; oxidizing the atomized molten lead-based alloy droplets; and solidifying the oxidized lead-based alloy droplets to form a doped leady oxide powder.

In another example, a doped leady oxide powder comprises an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin.

In another example, a process for the production of a lead-acid battery electrode comprises: mixing water and a doped leady oxide powder to produce an intermediate paste, wherein the doped leady oxide powder comprises an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin; and mixing aqueous sulfuric acid with the intermediate paste to produce an active material precursor paste.

In another example, a lead-acid battery electrode comprises: a lead-based alloy grid; and an active material pasted on the lead-based alloy grid, wherein the active material is formed from a doped leady oxide powder comprising an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin.

In another example, a process for the production of a lead-acid battery comprises: electrically interconnecting a plurality of electrodes to produce a cell, wherein the electrodes comprise an active material formed from a doped leady oxide powder comprising an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin; assembling at least one cell inside a casing; adding an aqueous sulfuric acid electrolyte into the casing and in contact with the plurality of electrodes; and sealing the casing.

In another example, a lead-acid battery comprises an electrode comprising an active material formed from a doped leady oxide powder comprising an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin.

It is understood that the invention(s) described in this specification are not necessarily limited to the example embodiments summarized in this Summary.

BRIEF DESCRIPTION OF THE DRAWINGS

Various features and characteristics of the invention(s) described in this specification may be more thoroughly understood by reference to the accompanying figures, in which.

The reader will appreciate the foregoing features and characteristics, as well as others, upon considering the following detailed description of the invention according to this specification.

DESCRIPTION

The invention(s) described in this specification provide beneficial improvements to lead-acid battery technology.

Lead-acid batteries operate in accordance with two electrochemical reactions at the positive electrodes (cathodes) and two electrochemical reactions at the negative electrodes (anodes). During battery discharge, electrons conduct from the negative electrodes, through an external circuit to do work, and to the positive electrodes. During battery discharge, at the positive electrodes, lead dioxide is reduced to lead sulfate according to the chemical equation:

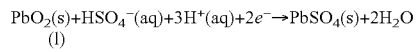
(1)

During battery discharge, at the negative electrodes, metallic lead is oxidized to lead sulfate according to the chemical equation:

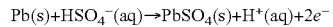

During battery charging and recharging, electrons conduct from the positive electrodes, through an external circuit that provides the energy driving the conduction (e.g., connected to a voltage/current source), and to the negative electrodes. During battery charging and recharging, at the positive electrodes, lead sulfate is oxidized to lead dioxide according to the chemical equation:

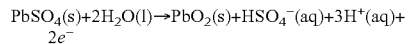

During battery charging and recharging, at the negative electrodes, lead sulfate is reduced to metallic lead according to the chemical equation:

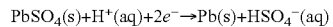

Figure 1:
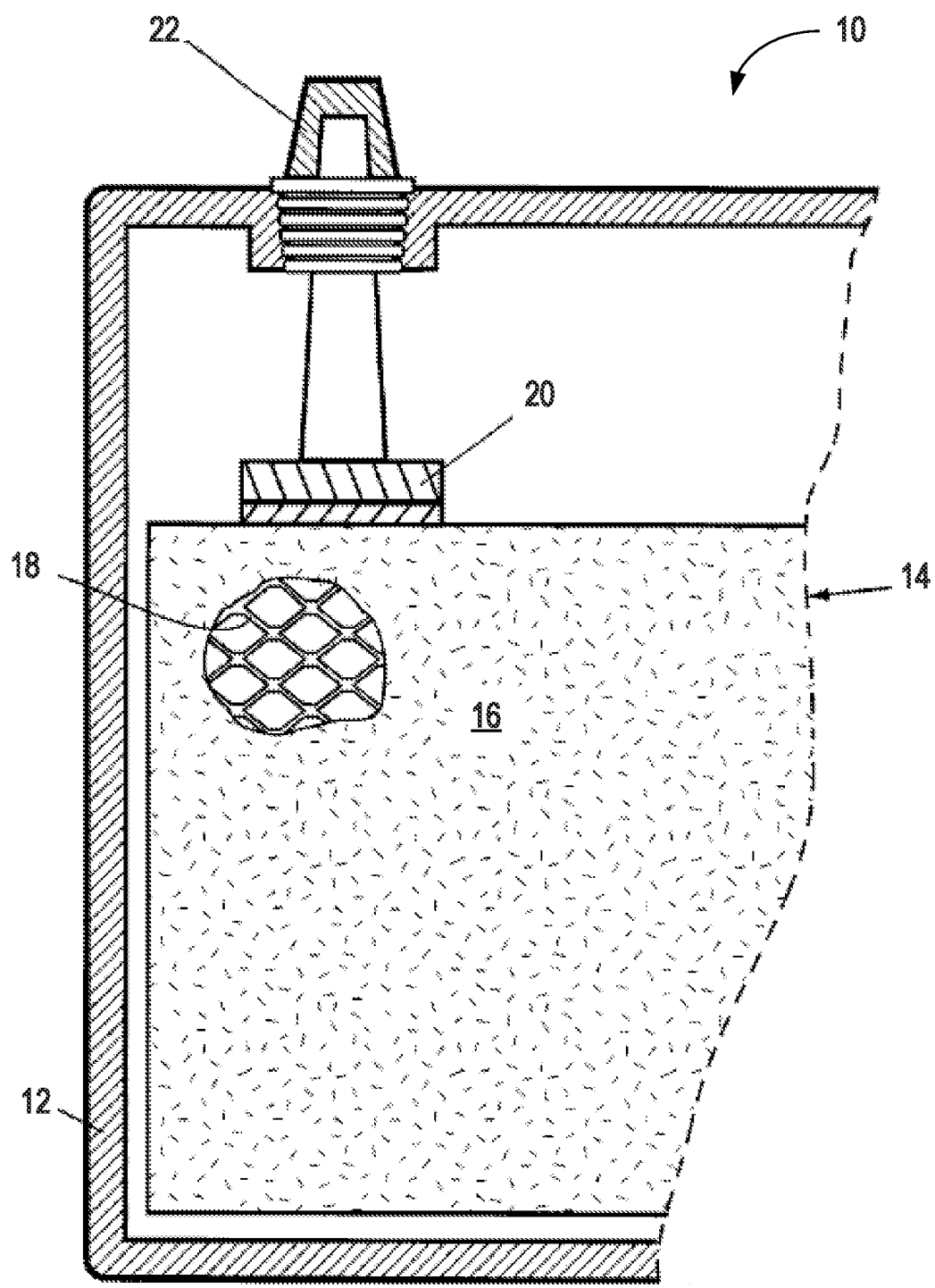
FIG. 1 is a partial cross-sectional schematic diagram of a lead-acid battery comprising a pasted plate electrode.

Lead-acid batteries may be constructed of cells comprising pasted-plate electrodes. For example, referring to FIG. 1, a lead-acid battery 10 in a charged state comprises a pasted-plate electrode 14. The pasted-plate electrode 14 (which could be either a positive or negative electrode) comprises active material 16 pasted, cured, and formed on an underlying grid structure 18. If the pasted-plate electrode 14 is a positive electrode (cathode), then the active material 16 comprises lead dioxide. If the pasted-plate electrode 14 is a negative electrode (anode), then the active material 16 comprises spongy metallic lead. The pasted-plate electrode 14 is shown positioned inside a container 12, which also contains additional electrodes (not shown) connected in series or parallel to the electrode 14 via a metal (e.g., lead or lead alloy) strap 20. The strap 20 is shown connected to an external battery terminal 22.

At the point of manufacture, the negative plate electrodes of lead-acid batteries generally comprise spongy (porous) metallic lead active material adhered to a solid grid structure made of a lead-based alloy, and the positive plate electrodes generally comprise an active material comprising lead dioxide ($PbO_2$) adhered to a grid structure also made of a lead-based alloy (which may be the same as or different from the lead-based alloy forming the negative electrode grid). The production of negative and positive electrodes comprises a pasting process in which pastes comprising precursors of the active materials are applied to the underlying grids, cured, and electrochemically converted (i.e., formed) into the active materials through an electrochemical formation process.

The pastes used to produce lead-acid battery electrodes generally comprise an aqueous sulfuric acid solution, a leady oxide powder, and optional additives. The leady oxide powder (which is the precursor of the metallic lead active material (negative electrode) and the lead dioxide active material (positive electrode) may be produced, for example, from purified metallic lead or a lead-based alloy using a ball mill process, a Barton process, a refractory furnace process, a rotary tube furnace process, a high-temperature fume-type process, or other lead oxidation and powder production process.

The chemical composition of the leady oxide powders depends upon the source material (i.e., purified metallic lead or a lead-based alloy), the specific powder production process (e.g., a ball mill process or a Barton process), and the operating parameters of the powder production process. For example, using a purified metallic lead source in a ball mill process or a Barton process may produce a leady oxide powder comprising lead dioxide (PbO) and metallic lead (Pb) in varying proportions depending upon the process parameters. See, for example, Dix, "A Comparison of Barton-Pot and Ball-Mill Processes for Making Leady Oxide," *J. Power Sources,* 19 (1987), pp. 157-161.

When a lead-based alloy source is used in a ball mill process, a Barton process, or other lead oxide production process, the resulting powder product comprises a doped leady oxide. The doped leady oxide comprises lead oxide (primarily α-PbO) doped with the non-lead alloying elements from the alloy, oxides of the non-lead alloying elements, and, un-oxidized lead-based alloy. As used herein, the term "doped leady oxide" refers to oxidized powder products comprising doped lead oxide, and which may or may not also comprise un-oxidized lead-based alloy particles and/or mixed phase particles comprising a lead-based alloy phase and a doped lead oxide phase. For example, a lead-based alloy containing alloying additions of bismuth, antimony, arsenic, and tin fed into a ball mill process, Barton process, or other lead oxide production process may produce a doped leady oxide powder comprising, in various proportions, particles of the lead-based alloy, particles of lead oxide doped with bismuth, antimony, arsenic, and tin (and/or oxides of any thereof), and mixed phase particles comprising both phases (i.e., lead-based alloy and doped lead oxide). A doped leady oxide powder may be used as an active material precursor ingredient in pastes formulated to produce lead-acid battery active material, and electrodes comprising the active material, derived from the doped leady oxide powder.

A lead-based alloy useful for the production of doped leady oxide powders comprises alloying additions of bismuth, antimony, arsenic, and tin. The lead-based alloy may comprise, in percent by total alloy weight, 0.0030% to 0.0900% bismuth, 0.0010% to 0.0300% antimony, 0.0010% to 0.0300% arsenic, and 0.0010% to 0.0100% tin. The lead-based alloy may further comprise up to 0.0500% silver and/or up to 0.0100% thallium.

The lead-based alloy includes bismuth as an alloying addition that may improve the cycle-life, energy storage capacity, and depth-of-discharge capacity of lead-acid batteries comprising active material produced from the lead-based alloy. The lead-based alloy may comprise, in percent by total alloy weight, 0.0030% to 0.0900% (30-900 ppm) bismuth, or any sub-range subsumed therein, such as, for example, 0.0050% to 0.0700% (50-700 ppm), 0.0090% to 0.0600% (90-600 ppm), 0.0090% to 0.0150% (90-150 ppm), or 0.0090% to 0.0110% (90-110 ppm). The lead-based alloy may comprise bismuth, for example, in a range of (in percent by total alloy weight): 0.0040% to 0.0800%, 0.0050% to 0.0700%, 0.0060% to 0.0600%, 0.0070% to 0.0500%, 0.0080% to 0.0400%, 0.0090% to 0.0300%, 0.0100% to 0.0200%, 0.0090% to 0.0250%, 0.0090% to 0.0200%, 0.0095% to 0.0500%, 0.0095% to 0.0250%, 0.0095% to 0.0200%, 0.0095% to 0.0150%, 0.0100% to 0.0500%, 0.0100% to 0.0250%, 0.0100% to 0.0150%, or 0.0095% to 0.0105% (i.e., 40-800 ppm, 50-700 ppm, 60-600 ppm, 70-500 ppm, 80-400 ppm, 90-300 ppm, 100-200 ppm, 90-250 ppm, 90-200 ppm, 95-500 ppm, 95-250 ppm, 95-200 ppm, 95-150 ppm, 100-500 ppm, 100-250 ppm, 100-150 ppm, or 95-105 ppm).

The lead-based alloy includes antimony as an alloying addition that may increase the oxidation rate of the lead-based alloy to doped leady oxide powder in a ball mill process, Barton process, or other lead oxide production process. The antimony may also improve the energy storage capacity and charge-discharge cycle performance of lead-acid batteries comprising active material produced from the lead-based alloy. The lead-based alloy may comprise, in percent by total alloy weight, 0.0010% to 0.0300% (10-300 ppm) antimony, or any sub-range subsumed therein, such as, for example, 0.0020% to 0.0200% (20-200 ppm), 0.0075% to 0.0125% (75-125 ppm), 0.0090% to 0.0150% (90-150 ppm) or 0.0090% to 0.0110% (90-110 ppm). The lead-based alloy may comprise antimony, for example, in a range of (in percent by total alloy weight): 0.0030% to 0.0190%, 0.0040% to 0.0180%, 0.0050% to 0.0170%, 0.0060% to 0.0160%, 0.0070% to 0.0150%, 0.0080% to 0.0140%, 0.0090% to 0.0130%, 0.0100% to 0.0200%, 0.0065% to 0.0135%, 0.0070% to 0.0130%, 0.0080% to 0.0120%, 0.0085% to 0.0115%, or 0.0095% to 0.0105% (i.e., 30-190 ppm, 40-180 ppm, 50-170 ppm, 60-160 ppm, 70-150 ppm, 80-140 ppm, 90-130 ppm, 100-120 ppm, 65-135 ppm, 70-130 ppm, 80-120 ppm, 85-115 ppm, or 95-105 ppm).

The lead-based alloy includes arsenic as an alloying addition that may improve the energy storage capacity and charge-discharge cycle performance of lead-acid batteries comprising active material produced from the lead-based alloy. The lead-based alloy may comprise, in percent by total alloy weight, 0.0010% to 0.0300% (10-300 ppm) arsenic, or any sub-range subsumed therein, such as, for example, 0.0020% to 0.0200% (20-200 ppm), 0.0075% to 0.0125% (75-125 ppm), 0.0090% to 0.0150% (90-150 ppm), or 0.0090% to 0.0110% (90-110 ppm). The lead-based alloy may comprise arsenic, for example, in a range of (in percent by total alloy weight): 0.0030% to 0.0190%, 0.0040% to 0.0180%, 0.0050% to 0.0170%, 0.0060% to 0.0160%, 0.0070% to 0.0150%, 0.0080% to 0.0140%, 0.0090% to 0.0130%, 0.0100% to 0.0200%, 0.0065% to 0.0135%, 0.0070% to 0.0130%, 0.0080% to 0.0120%, 0.0085% to 0.0115%, or 0.0095% to 0.0105% (i.e., 30-190 ppm, 40-180 ppm, 50-170 ppm, 60-160 ppm, 70-150 ppm, 80-140 ppm, 90-130 ppm, 100-120 ppm, 65-135 ppm, 70-130 ppm, 80-120 ppm, 85-115 ppm, or 95-105 ppm).

The lead-based alloy includes tin as an alloying addition that may deoxidize the metallic lead and prevent the loss of antimony, arsenic, and/or bismuth during initial melting and formulation of the lead-based alloy composition. The lead-based alloy may comprise, in percent by total alloy weight, 0.0010% to 0.0090% (10-90 ppm) tin, or any sub-range subsumed therein, such as, for example, 0.0010% to 0.0075% (10-75 ppm), 0.0045% to 0.0075% (45-75 ppm), or 0.0050% to 0.0075% (50-75 ppm). The lead-based alloy may comprise tin, for example, in a range of (in percent by total alloy weight): 0.0010% to 0.0080%, 0.0010% to 0.0070%, 0.0020% to 0.0075%, 0.0020% to 0.0070%, 0.0025% to 0.0075%, 0.0030% to 0.0060%, 0.0035% to 0.0050%, 0.0040% to 0.0060%, 0.0040% to 0.0050%, 0.0045% to 0.0060%, 0.0045% to 0.0055%, 0.0035% to 0.0045% (i.e., 10-80 ppm, 10-70 ppm, 20-75 ppm, 20-70 ppm, 25-75 ppm, 30-60 ppm, 35-50 ppm, 40-60 ppm, 40-50 ppm, 45-60 ppm, 45-55 ppm, or 35-45 ppm).

The lead-based alloy may include silver. Silver alloying additions decrease the rate of oxidation of lead and, therefore, silver is often added to lead-based alloys used to produce the grid components of pasted-plate electrodes in order to decrease the rate of corrosion of the battery grids during service life. The decrease in lead oxidation rate that results from the presence of silver is undesirable in lead-based alloys used to produce doped leady oxide powders in a ball mill process, Barton process, or other lead oxide production process, because the reduced oxidation rate results in lower leady oxide production rates, higher amounts of un-oxidized lead in the oxide product, and larger oxide particles. However, as batteries containing silver in the lead-based alloy of the electrode grids are recycled, the silver content of recycled (secondary) lead increases. Therefore, the silver content of the lead-based alloy described in this specification should not exceed 0.0750% (up to 750 ppm) by total alloy weight. For example, the lead-based alloy may include silver, in percent by total alloy weight, up to 0.0500%, up to 0.0100%, up to 0.0075%, up to 0.0050%, up to 0.0045%, up to 0.0040%, up to 0.0035%, up to 0.0030%, up to 0.0025%, up to 0.0015%, up to 0.0010%, up to 0.00050%, up to 0.0001%, from 0.0001% to 0.0100%, from 0.0005% to 0.0050%, from 0.0015% to 0.0045%, from 0.0025% to 0.0045%, from 0.0035% to 0.0045%, from 0.0038% to 0.0045%, from 0.0015% to 0.0025%, or from 0.0018% to 0.0025% (i.e., up to 500 ppm, up to 100 ppm, up to 75 ppm, up to 50 ppm, up to 45 ppm, up to 40 ppm, up to 35 ppm, up to 30 ppm, up to 25 ppm, up to 15 ppm, up to 10 ppm, up to 5 ppm, up to 1 ppm, 1-100 ppm, 5-50 ppm, 15-45 ppm, 25-45 ppm, 35-45 ppm, 38-45 ppm, 15-25 ppm, or 18-25 ppm).

The lead-based alloy may include thallium. The thallium content of the lead-based alloy described in this specification should not exceed 0.0100% (up to 100 ppm) by total alloy weight. For example, the lead-based alloy may include thallium, in percent by total alloy weight, up to 0.0100%, up to 0.0050%, up to 0.0025%, up to 0.0010%, up to 0.00050%, from 0.0001% to 0.0100%, from 0.0001% to 0.0050%, from 0.0001% to 0.0025%, from 0.0005% to 0.0025%, from 0.0001% to 0.0010%, from 0.0005% to 0.0010%, or from 0.0001% to 0.0005% (i.e., up to 100 ppm, up to 50 ppm, up to 25 ppm, up to 10 ppm, up to 5 ppm, 1-100 ppm, 1-50 ppm, 1-25 ppm, 5-25 ppm, 1-10 ppm, 5-10 ppm, or 1-5 ppm).

The lead-based alloy may include magnesium. As described above, silver is a recognized impurity in recycled (secondary) lead that decreases the rate of oxidation and, therefore, can be disadvantageous in lead-based alloys for the production of doped leady oxides and lead-acid battery active materials. In order to off-set any decrease in oxidation rate resulting from the presence of silver, for example, the lead-based alloy may optionally include at least 0.0010% magnesium (10 ppm) by total alloy weight. For example, the lead-based alloy may include magnesium, in percent by total alloy weight, of at least 0.0015%, at least 0.0020%, at least 0.0025%, at least 0.0030%, at least 0.0035%, at least 0.0040%, or at least 0.0045% (i.e., at least 15 ppm, at least 20 ppm, at least 25 ppm, at least 30 ppm, at least 35 ppm, at least 40 ppm, or at least 45 ppm). The lead-based alloy may include magnesium, in percent by total alloy weight, up to 0.0100% (100 ppm), or, for example, up to 0.0095%, up to 0.0090%, up to 0.0085%, up to 0.0080%, up to 0.0075%, up to 0.0070%, up to 0.0065%, up to 0.0060%, up to 0.0055%, or up to 0.0050% (i.e., up to 95 ppm, up to 90 ppm, up to 85 ppm, up to 80 ppm, up to 75 ppm, up to 70 ppm, up to 65 ppm, up to 60 ppm, up to 55 ppm, or up to 50 ppm). The lead-based alloy may include magnesium, in percent by total alloy weight, ranging from 0.0010% to 0.0100% (10-100 ppm), or any sub-range subsumed therein, such as, for example, 0.0010% to 0.0050% (10-50 ppm).

Additionally, the lead-based alloy may contain a total of less than 0.0500 weight percent (500 ppm) of elements other than lead, bismuth, antimony, arsenic, tin, silver, and thallium. The lead-based alloy may contain a total of less than 0.0100 weight percent (100 ppm) of elements other than lead, bismuth, antimony, arsenic, tin, silver, and thallium. The lead-based alloy may contain a total of less than 0.0050 weight percent (50 ppm) of elements other than lead, bismuth, antimony, arsenic, tin, silver, and thallium. The lead-based alloy may contain a total of less than 0.0010 weight percent (10 ppm) of elements other than lead, bismuth, antimony, arsenic, tin, silver, and thallium.

The lead-based alloy may contain less than 0.0010 weight percent (10 ppm), in total, of tellurium, selenium, nickel, copper, molybdenum, manganese, cobalt, and chromium, which may be incidental impurities in the lead-based alloy. The lead-based alloy may contain less than 0.0005 weight percent (5 ppm), individually, of tellurium, selenium, nickel, copper, molybdenum, manganese, cobalt, and chromium, as incidental impurities in the lead-based alloy. The lead-based alloy may contain less than 0.0001 weight percent (1 ppm), individually, of tellurium, selenium, nickel, copper, molybdenum, manganese, cobalt, and chromium, as incidental impurities in the lead-based alloy. The lead-based alloy may contain any one or more of the elements listed in Table 1, if at all, as incidental impurities in an amount no greater than the maximums specified in the Table.

TABLE 1

Example Incidental Impurities and Example Maximums

| Element | Weight percentage | Parts-per-million by weight |
|---|---|---|
| Ag | ≤0.0100 | ≤100 |
| Tl | ≤0.0010 | ≤10 |
| Se | ≤0.0001 | ≤1 |
| Zn | ≤0.0005 | ≤5 |
| Cr | ≤0.0005 | ≤1 |
| Ni | ≤0.0002 | ≤2 |
| Cu | ≤0.0007 | ≤7 |

TABLE 1-continued

Example Incidental Impurities and Example Maximums

| Element | Weight percentage | Parts-per-million by weight |
|---|---|---|
| Te | ≤0.0001 | ≤1 |
| Fe | ≤0.0005 | ≤5 |
| Cd | ≤0.0001 | ≤1 |
| Mn | ≤0.0002 | ≤2 |

The lead-based alloy may have a nominal (i.e., target) composition in parts-per-million by weight of 100 ppm bismuth, 100 ppm antimony, 100 ppm arsenic, 40 ppm tin, and balance lead and incidental impurities. Example compositions include, but are not limited to, those shown below in Tables 2 and 3.

TABLE 2

Example Lead-based Alloy Composition

| Element | Weight percentage | Parts-per-million by weight |
|---|---|---|
| Bi | 0.0030-0.0250 | 30-250 |
| Sb | 0.0090-0.0110 | 90-110 |
| As | 0.0090-0.0110 | 90-110 |
| Sn | 0.0050-0.0075 | 50-75 |
| Ag | ≤0.0100 | ≤100 |
| Tl | ≤0.0010 | ≤10 |
| Se | ≤0.0001 | ≤1 |
| Zn | ≤0.0005 | ≤5 |
| Cr | ≤0.0005 | ≤1 |
| Ni | ≤0.0002 | ≤2 |
| Cu | ≤0.0007 | ≤7 |
| Te | ≤0.0001 | ≤1 |
| Fe | ≤0.0005 | ≤5 |
| Cd | ≤0.0001 | ≤1 |
| Mn | ≤0.0002 | ≤2 |
| Pb + other incidental impurities | balance | balance |

TABLE 3

Example Lead-based Alloy Compositions (ppm by total weight)

| Element | Bi | Sb | As | Sn | Others** | Pb |
|---|---|---|---|---|---|---|
| Ex-1 | 95-105 | 95-105 | 95-105 | 35-45 | incidental levels | balance |
| Ex-2 | 90-110 | 90-110 | 90-110 | 30-50 | incidental levels | balance |
| Ex-3 | 75-125 | 75-125 | 75-125 | 25-75 | incidental levels | balance |
| Ex-4 | 50-150 | 50-150 | 50-150 | 25-75 | incidental levels | balance |
| Ex-5 | 50-150 | 50-150 | 25-150 | 15-75 | incidental levels | balance |
| Ex-6 | 50-150 | 50-125 | 50-125 | 15-50 | incidental levels | balance |
| Ex-7 | 75-150 | 75-115 | 50-115 | 15-50 | incidental levels | balance |
| Ex-8 | 30-250 | 90-110 | 90-110 | 50-75 | incidental levels | balance |

**In all examples, silver can be present at up to 100 ppm, and thallium can be present at up to 10 ppm, or any lower maximum or subsumed sub-range.

The lead-based alloy may be produced using known lead metallurgy techniques, including, but not limited to, primary lead smelting and drossing, secondary (recycled) lead processing, and pyrometallurgical and/or electrolytic refining operations. For example, predetermined amounts of bismuth, antimony, arsenic, and tin may be added as alloying additions to purified primary and/or secondary (recycled) molten lead to formulate a chemical composition as described above. The formulated molten lead-based alloy may be cast into ingots or directly fed into a downstream operation such as, for example, a Barton oxidation process.

The lead-based alloy described above may be used for the production of doped leady oxide powder in a Barton process, ball mill process, or other lead oxide production process.

A Barton process is a continuous or semi-continuous process in which metallic lead or lead-based alloy is melted and fed vertically into a stirred production vessel (such as a cast iron pot reactor, for example). The molten lead or lead-based alloy fed through the top of the production vessel contacts spinning blades, which break-up the molten lead or lead-based alloy stream into small atomized droplets. The droplets of molten lead or lead-based alloy are then oxidized to lead oxide by air flow through the production vessel. The oxidized lead or lead-based alloy solidifies into lead oxide or doped lead oxide particles that are pneumatically transported from the production vessel to a product recovery system (generally comprising a settling chamber, cyclone, and/or baghouse, for example). A Barton process is controlled by adjusting the rate of molten lead or lead-based alloy feed, the speed of the stirring blades (agitator), the temperature of the system, and the rate of air flow through the production vessel.

In one example, lead-based alloy described above may be used to produce doped leady oxide powder in a Barton reactor operating at a temperature in the range of 675° F. to 700° F. (357-371° C.), with an agitator speed in the range of 150-500 RPM, and an air blower operating in the range of 44-49 Hertz.

A ball mill process is a batch or semi-batch process in which metallic lead or lead-based alloy ingots (also known as pigs or slugs) are charged with air into a ball mill. Frictional heat generated by the tumbling solid lead or lead-based alloy ingots initiates an oxidation reaction in which oxygen in the air reacts with the lead to produce lead oxide. During the milling, particles of the lead oxide that form on the surface of the ingots and particles of un-oxidized lead break off from the ingots, producing a powder that can be removed from the ball mill by a circulating air stream. Downstream centrifugal mills and cyclones may be used to collect larger particles, and finer particles may be collected in a baghouse.

A refractory furnace process is a batch process in which a solid metallic lead or lead-based alloy charge is heated by a gas flame impinging on its surface in a furnace vessel. The solid metallic lead or lead-based alloy charge is located in a steel pan equipped with a rotating vertical shaft and a horizontal crossarm comprising mounted plows. The plows continuously move the metallic lead or lead-based alloy charge to expose fresh surfaces for oxidation by the impinging gas flame as oxidized material breaks off from the charge and produces a powder product.

A rotary tube furnace process is a continuous process in which molten lead or lead-based alloy is fed into the upper end of a refractory lined inclined rotating tube. An oxidizing flame located in the lower end of the tube oxidizes the molten lead or lead-based alloy flowing through the tube. The tube is long enough so that the molten lead or lead-based alloy oxidizes before emerging from the lower end as a powder product.

A high-temperature fume-type process is a continuous process in which a powder of lead oxide is produced by burning a fine stream of molten lead or lead-based alloy in a special blast-type burner having a flame temperature around 1200° C., which vaporizes and oxidizes the molten lead or lead-based alloy feed to produce a fume. The fume is swept out of the reaction chamber by an air stream, cooled in a series of "goosenecks," and collected in a baghouse.

A process for the production of doped leady oxide may comprise melting the lead-based alloy described above, atomizing the molten lead-based alloy to form molten lead-based alloy droplets, oxidizing the atomized molten lead-based alloy droplets, and solidifying the oxidized lead-based alloy droplets to form a doped leady oxide powder. It is understood that during the oxidation at least a portion of the molten lead-based alloy is oxidized to doped leady oxide, but that the molten lead-based alloy may not completely oxidize to doped leady oxide, in which case the resulting product may comprise doped leady oxide particles, un-oxidized lead-based alloy particles, and/or mixed phase particles comprising a lead-based alloy phase and a doped leady oxide phase. The molten lead-based alloy may be fed into a stirred reaction vessel (e.g., a Barton pot reactor) where the molten lead-based alloy is atomized by impinging on spinning blades (agitator) located in the reaction vessel, which break-up the molten lead-based alloy stream into atomized droplets. The droplets of molten lead-based alloy may be oxidized to doped leady oxide by air flowing through the reaction vessel. The atomized droplets (including un-oxidized alloy and/or oxidized material) may solidify within the reaction vessel into doped leady oxide particles, which may be pneumatically transported from the reaction vessel to a powder recovery system.

A process for the production of doped leady oxide may comprise milling the lead-based alloy described above. For example, ingots comprising the lead-based alloy may be charged into a ball mill and milled in air, wherein frictional heat generated by the tumbling and impacting lead-based alloy ingots drives an oxidation reaction in which oxygen in the air reacts with the alloy to produce doped leady oxide. During the milling, particles of the doped leady oxide that form on the surface of the ingots and particles of un-oxidized alloy break off from the ingots, forming a powder that can be removed from the ball mill by a circulating air stream and pneumatically transported to a powder recovery system.

The doped leady oxide powder produced from the lead-based alloy described above may be used as an active material precursor ingredient to formulate pastes for the production of lead-acid battery electrodes comprising active material formed from the doped leady oxide powder. Before formulation into pastes, the doped leady oxide powder may be post-milled to refine the particle size and/or particle morphology.

The pastes used to produce lead-acid battery electrodes may comprise a mixture of aqueous sulfuric acid and a doped leady oxide powder comprising an oxidation product of the lead-based alloy described above. The pastes may further comprise additives such as polyester fibers, red lead ($Pb_3O_4$/2 $PbO.PbO_2$), seeding materials (e.g., tetrabasic lead sulfate ($4PbO.PbSO_4$) or tribasic lead sulfates ($4PbO.PbSO_4$)), expander materials (e.g., carbon, barium sulfate, and/or lignosulfonate), and/or binder materials (e.g., ammonium sulfate or magnesium sulfate). The pastes may be formulated to provide, among other properties, a pre-cure consistency (rheology) that facilitates the application of the pastes onto lead-based alloy grids, sufficient cohesive binding of the paste material together and adhesive binding to the grids during curing, and sufficient porosity in the cured paste material.

The doped leady oxide powders used to formulate the pastes applied to the electrode grids cannot be effectively applied to the grids in a dry condition because of insufficient cohesion among the powder particles and adhesion to the grid substrate. Mixing the doped leady oxide powders with water, aqueous sulfuric acid, and optional additives to make a paste provides greater cohesion, adhesion, and enables application to the grids. During a paste-mixing operation, the doped leady oxide powder and water may be blended in a mixer to form a slurry or paste. Aqueous sulfuric acid may then be added with constant mixing and optional cooling until a desired paste consistency and density are attained. The sulfuric acid reacts with the doped leady oxide to form a doped leady sulfate, which in addition to expanding the paste volume and giving it greater porosity, provides a binding effect so that the cured plate can be handled without the loss of significant amounts of material. The application of the pastes to the underlying alloy grids may be performed manually or using a pasting system to fill the open spaces in the grid. In either case, the pastes are applied to the alloy grids and form an evenly distributed mass of paste material integrated into the grid structure. The plates (pasted grids) may be rolled to a predetermined thickness and/or flash dried to remove moisture.

The pastes comprising doped leady oxide powders produced from the lead-based alloy described above may be applied to grids comprising metallic lead or any suitable lead-based alloy such as, for example, lead-antimony alloys, lead-calcium alloys, lead-calcium-tin alloys, lead-calcium-tin-silver alloys, lead-calcium-aluminum alloys, or lead-tin-calcium-aluminum alloys.

The plates (pasted grids) may be cured in still or forced air at elevated temperatures and controlled relative humidity in a hydrosetting operation. Under the curing/hydrosetting conditions, the water in the paste at least partially evaporates and the sulfuric acid reacts with any lead-based alloy and/or doped leady oxide in the paste to form doped lead sulfate, thereby solidifying and hardening the paste. The applied pastes cure to a hardened mass, in which condition the pastes firmly adhere to the grids, providing pasted plates that can be handled and manipulated during further processing and battery construction without mechanical loss of cured paste material.

After curing/hydrosetting, the metallic lead alloy and/or doped leady oxide precursors in the paste (largely in the cured form of doped lead sulfate) are electrochemically converted into spongy lead alloy active material (negative electrodes/anodes) or doped leady oxide battery active material (positive electrodes/cathodes) in a "forming" or "formation" operation, which is essentially an initial electrochemical charging operation that initially forms lead-acid battery electrodes. Depending on the particular manufacturing implementation, the pasted and cured plates may be formed into electrodes independently (e.g., in cell assemblies) or in completed batteries. For example, the pasted and cured plates may be mounted in aqueous sulfuric acid tanks with alternating plates configured for formation into positive and negative electrodes. The positive electrode plates may be electrically interconnected together in parallel in one group and the negative electrode plates electrically interconnected together in parallel in another group, and the electrode plates submerged in an aqueous sulfuric acid electrolyte solution. Electrical current may then be passed through the assembly of plates (electrodes) in a manner similar to battery charging or recharging, during which lead alloy, doped lead oxides, and doped lead sulfates in the group of positive electrode plates react to form doped lead dioxide active material, and doped lead oxides and doped lead sulfates in the group of negative electrode plates react to form spongy lead alloy active material. In some manufacturing implementations, the positive plates (electrodes) and the negative plates (electrodes) may be formed independently in separate aqueous sulfuric acid tanks against "dummy" electrodes.

Depending on the polarity, the passing of electrical current through the pasted and cured plates electrochemically converts lead alloy, doped lead oxides, and doped lead sulfates into an active material comprising brownish-colored doped lead dioxide, thus forming positive electrodes; or converts doped lead oxides and doped lead sulfates into an active material comprising grayish-colored spongy lead alloy, thus forming negative electrodes. The composition of the pastes used to respectively produce the active material of positive electrodes and negative electrodes is generally different and specifically formulated to provide physical and chemical properties particularly suited for the respective electrode types. For examples, paste formulations for the production of negative electrodes generally contain larger amounts of expander additives such as lignosulfonates and barium sulfonate, for example, than positive electrode paste formulations.

Upon completion of the forming operation, the electrodes may be washed and dried. In some manufacturing implementations, multiple grids may be cast, pasted, cured, and formed together, and these may be cut apart and sized to dimensions suitable for lead-acid battery cell construction. Formed negative electrode plates may also be rolled or pressed after removal from a forming tank to reduce surface roughness of the spongy lead alloy active material, which may form a relatively rough surface because of outgassing that may occur during the electrochemical reduction of doped lead oxides and doped lead sulfate to spongy lead alloy. The electrodes are then in condition for use in the construction of lead-acid battery cells.

The construction of lead-acid battery cells may comprise burning, brazing, or otherwise electrically interconnecting a plurality of like-polarity electrode plates to a lead or lead-based alloy strap. The electrical interconnection of a plurality of electrode plates produces a plate pack (i.e., a positive plate pack or a negative plate pack) in which the plurality of electrode plates are structurally spaced apart from each other, but electrically interconnected in parallel via the strap. A positive plate pack and a negative plate pack may be assembled together in an intermeshed configuration such that each positive plate of the positive plate pack is positioned adjacent to two negative plates of the negative plate pack. Electrically insulating porous separators or electrolyte-absorbing glass mats may be positioned between the adjacent positive and negative electrode plates to prevent short circuits through physical contact while permitting ionic flow. Assemblies comprising a positive plate pack and a negative plate pack form individual electrochemical cells. The positive electrode plates of a cell are located between two negative electrode plates, with optional intermediate separators, and the internal negative electrode plates of a cell are located between two positive electrode plates with optional intermediate separators.

A lead-acid battery comprises at least one individual electrochemical cell, and can comprise a plurality of cells electrically interconnected in series, inside a plastic casing containing aqueous sulfuric acid electrolyte. For example, a battery may comprise six, 2.1-volt cells interconnected in series, providing a 12.6-volt system at full charge. A completed lead-acid battery is produced by assembling the one or more cells inside the casing, electrically interconnecting the cells in series and with external terminals, filling the casing with the aqueous sulfuric acid electrolyte, and sealing the casing.

The lead-based alloy described in this specification provides beneficial improvements to lead-acid battery technology by producing electrode active materials (i.e., positive electrode active material comprising doped lead dioxide, or negative electrode active material comprising spongy lead-based alloy) that provide improved lead-acid battery performance. For example, lead-acid batteries comprising an electrode active material produced from doped leady oxide, which is produced from the lead-based alloy, may exhibit increased battery capacity, increased cycle-life, increased dynamic charge acceptance (DCA), decreased capacity fade on cycling, and decreased end of life capacity loss.

Conventional leady oxide powders used for the production of electrode active materials are produced mostly from refined and purified metallic lead in which one or more of bismuth, antimony, arsenic, or tin are pyrometallurgically or electrolytically removed to incidental impurity levels or less. The removal of bismuth, antimony, arsenic, and/or tin from the refined and purified lead used to produce leady oxide powders for active material production was driven, at least in part, by concerns that the presence of these elements in the active material of the negative electrode in a battery would undesirably contribute to self-discharge, gassing, water loss, and eventual dry-out of the battery. Indeed, concerns over transfer of these elements from positive electrode active material, through the electrolyte, and into negative electrode active material has driven their removal from the refined and purified lead used to produce the leady oxide powders for both positive and negative active material production. However, batteries comprising an active material produced from leady oxide powders produced from refined and purified lead exhibit less energy storage capacity than batteries comprising an active material produced from doped leady oxide powders produced from lead-based alloys containing one or more of bismuth, antimony, arsenic, and/or tin. Moreover, batteries comprising positive electrode active material produced from leady oxide powders produced from refined and purified lead exhibit significant capacity loss over time during charge-discharge cycling because the lead dioxide particles change shape and reduce particle-to-particle and particle-to-grid contact. This effect, however, is reduced in batteries comprising positive electrode active material produced from doped leady oxide powders produced from lead-based alloys containing one or more of bismuth, antimony, arsenic, and/or tin.

The microscopic material behavior of positive electrode active material during battery cycling can be conceptualized using an aggregate-of-spheres (AOS) or Kugelhaufen model in which the positive electrode active material comprises lead dioxide spheres interconnected together through lead dioxide neck regions. See Hullmeine et al., "Effect of Previous Charge/Discharge History on the Capacity of the $PbO_2/PbSO_4$ Electrode: the Hysteresis or Memory Effect," *Journal of Power Sources,* 25 (1989), pp. 27-47; and Winsel et al., "The Aggregate-of-Spheres ('Kugelhaufen') Model of the $PbO_2/PbSO_4$ Electrode," *Journal of Power Sources,* 30 (1990), pp. 209-226. In accordance with this model, the limitations in capacity, capacity loss during cycling, and cycle-life exhibited by batteries comprising positive electrode active material produced from leady oxides produced from purified lead can be explained, at least in part, by a gradual increase in ohmic resistance in the active material resulting from the reduction in size and number of neck regions between lead dioxide particles.

Figure 2:
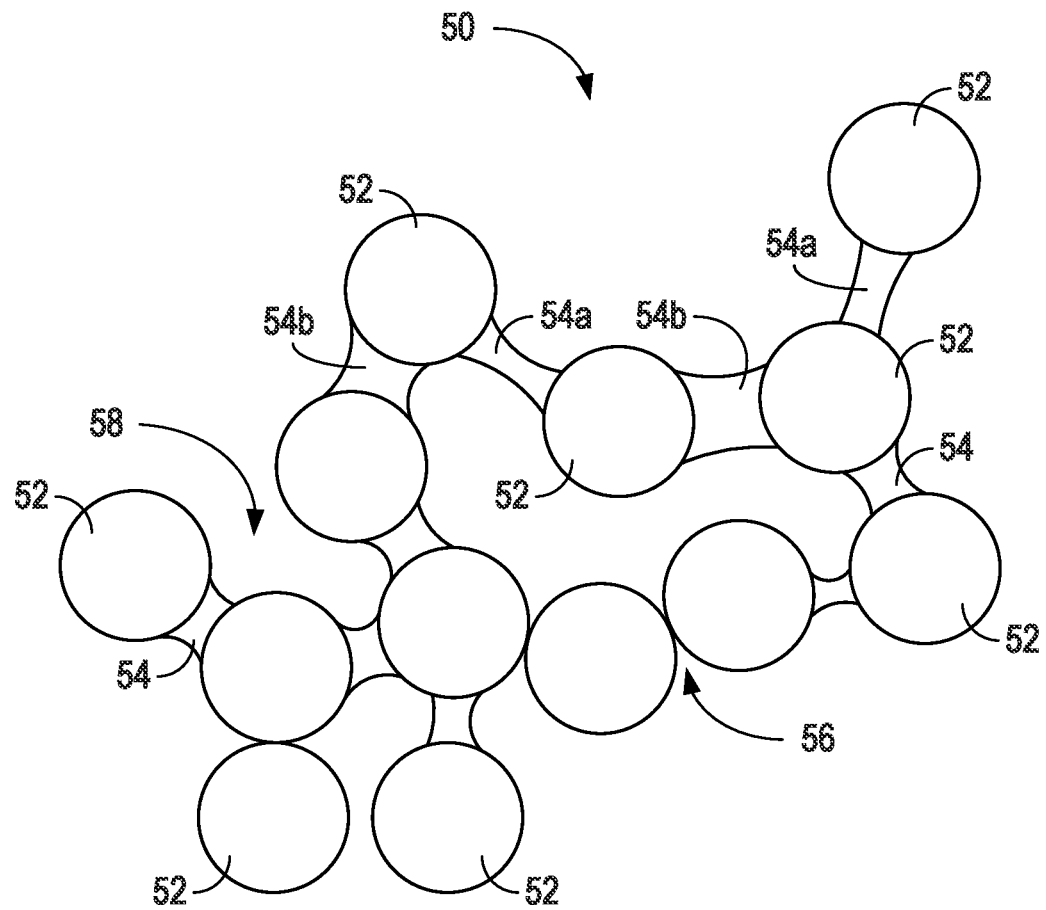
FIG. 2 is a schematic diagram of an aggregate-of-spheres model of lead dioxide active material in a positive electrode in a lead-acid battery.

Referring to FIG. 2, a positive electrode active material 50 comprises lead dioxide particles 52 interconnected through neck regions 54. The ohmic resistance (and thus the electrical conductivity) of the active material 50 is dependent, in part, on the number and relative size of the neck regions 54 between the particles 52. The conductivity of the active material 50 increases with increasing numbers of neck regions 54 interconnecting the particles 52. Likewise, neck regions 54a having relatively smaller cross-sectional areas provide for higher resistance (and lower conductivity) than neck regions 54b having relatively larger cross-sectional areas. Similarly, adjacent particles that only touch at points 56 provide higher resistance (and lower conductivity) than adjacent particles interconnected through neck regions. Furthermore, separation between adjacent particles, as shown at 58, eliminates a material pathway for electron flow, thus further increasing the resistance and decreasing the conductivity of the active material 50.

During battery discharge-recharge cycling, the positive electrode active material converts from lead dioxide to lead sulfate and back to lead dioxide. The conversion of lead dioxide to lead sulfate during discharge expands the bulk volume of the active material by about 30%, for example, which increases the inter-particle space and can fracture neck regions, thus decreasing the electrical conductivity and increasing the ohmic resistance of the active material. The conversion of lead sulfate back to lead dioxide during recharge changes the shape of the particles into a more rounded morphology and reduces the cross-sectional area of neck regions, again decreasing the electrical conductivity and increasing the ohmic resistance of the active material. The combination of these effects produces a gradual decrease in the apparent density of the lead dioxide active material, increased inter-particle separation (softening), and a decreased number of neck regions and neck area, all of which results in higher resistance and lower conductivity in the active material. The gradual increase in the intrinsic ohmic resistance and decrease in electrical conductivity of the active material manifests as decreased capacity over time in lead-acid batteries.

These undesirable cycling effects (increased positive active material resistance and resulting capacity loss) are reduced in batteries comprising doped lead dioxide active material formed from doped leady oxide produced from the lead-based alloy described in this specification. While not intending to be bound by theory, it is believed that the combination of bismuth, antimony, arsenic, and tin operates synergistically to increase the electrical conductivity of inter-particle neck regions, increase the rate and efficiency of lead sulfate oxidation to lead dioxide during initial formation, charging, and recharging, and decrease inter-particle separation and neck area reduction during cycling. The combination of bismuth, antimony, arsenic, and tin as alloying elements in metallic lead produces a doped lead dioxide positive electrode active material that exhibits a lower initial ohmic resistance (higher conductivity), which is maintained longer during cycling, thus increasing battery capacity, cycle-life, and dynamic charge acceptance (DCA), and decreasing capacity fade on cycling and end of life capacity loss.

Figure 3:
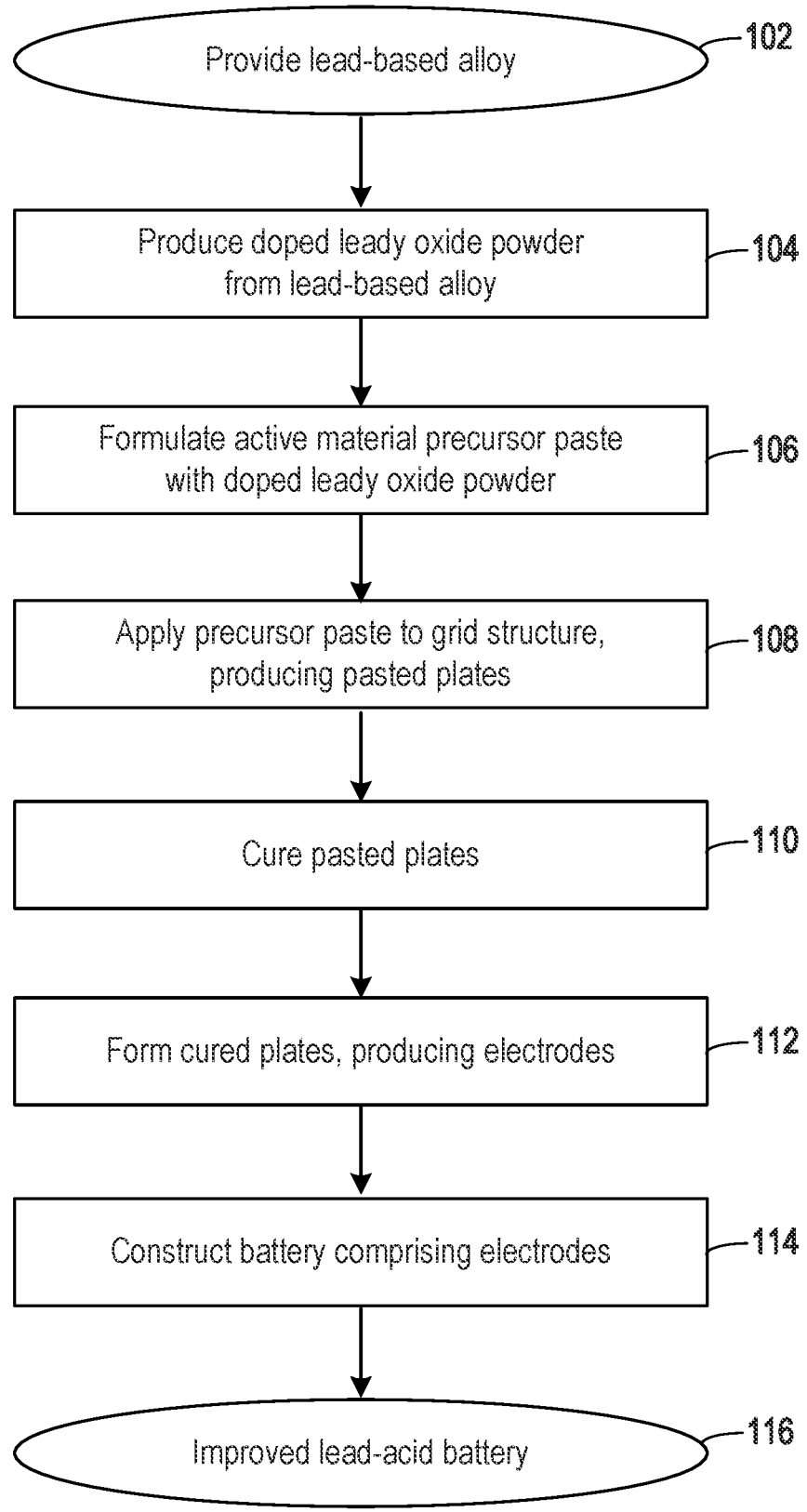
FIG. 3 is a flowchart diagram illustrating the processing of a lead-based alloy for the production of a lead-acid battery.

Thus, a lead-based alloy comprising bismuth, antimony, arsenic, and tin (e.g., 30-900 ppm Bi; 10-300 ppm Sb; 10-300 ppm As; and 10-100 ppm Sn) can be processed as shown in FIG. 3 to produce an improved lead-acid battery. The lead-based alloy is provided at 102. A doped leady oxide powder is produced from the lead-based alloy (e.g., in a Barton process or a ball mill process) at 104. An active material precursor paste is formulated with the doped leady oxide powder at 106. The active material precursor paste is applied to a grid structure at 108 to produce pasted plates. The pasted plates are cured at 110 and thereafter electrochemically formed at 112 to produce electrodes. A lead-acid battery comprising the electrodes is constructed at 114, which produces an improved lead-acid battery at 116.

The lead-based alloy described in this specification may be useful for the production of doped leady oxide and the positive and/or negative electrode active material in any type of lead-acid battery, including, but not limited to, automobile starting, lighting, and ignition (SLI) batteries; motive power (traction) batteries; and stationary/standby (back-up) batteries. The lead-based alloy described in this specification may be useful for the production of doped leady oxide and the positive and/or negative electrode active material in valve-regulated lead-acid (VRLA) batteries or flooded lead-acid batteries.

EXAMPLES

Example 1: Production of Alloy Composition

A lead-based alloy was formulated within the compositional specification provided below in Table 4.

TABLE 4

| Lead-based Alloy Composition (ppm by total weight) | | | | | | |
|---|---|---|---|---|---|---|
| Element | Bi | Sb | As | Sn | Ag | Others** | Pb |
| Example 1 | 90-120 | 90-110 | 90-110 | 50-75 | 25-50 | incidental levels | balance |

**All other incidental impurity elements were below the maximums shown above in Table 1.

The lead-based alloy was melt formulated by adding the bismuth, antimony, arsenic, and tin alloying elements to molten secondary lead at a temperature in the range of 820° F. to 850° F. (438-454° C.) and cast into ingots at a casting temperature in the range of 750° F. to 850° F. (399-454° C.).

Example 2: Barton Process for Production of Doped Leady Oxide Product

Figure 4:
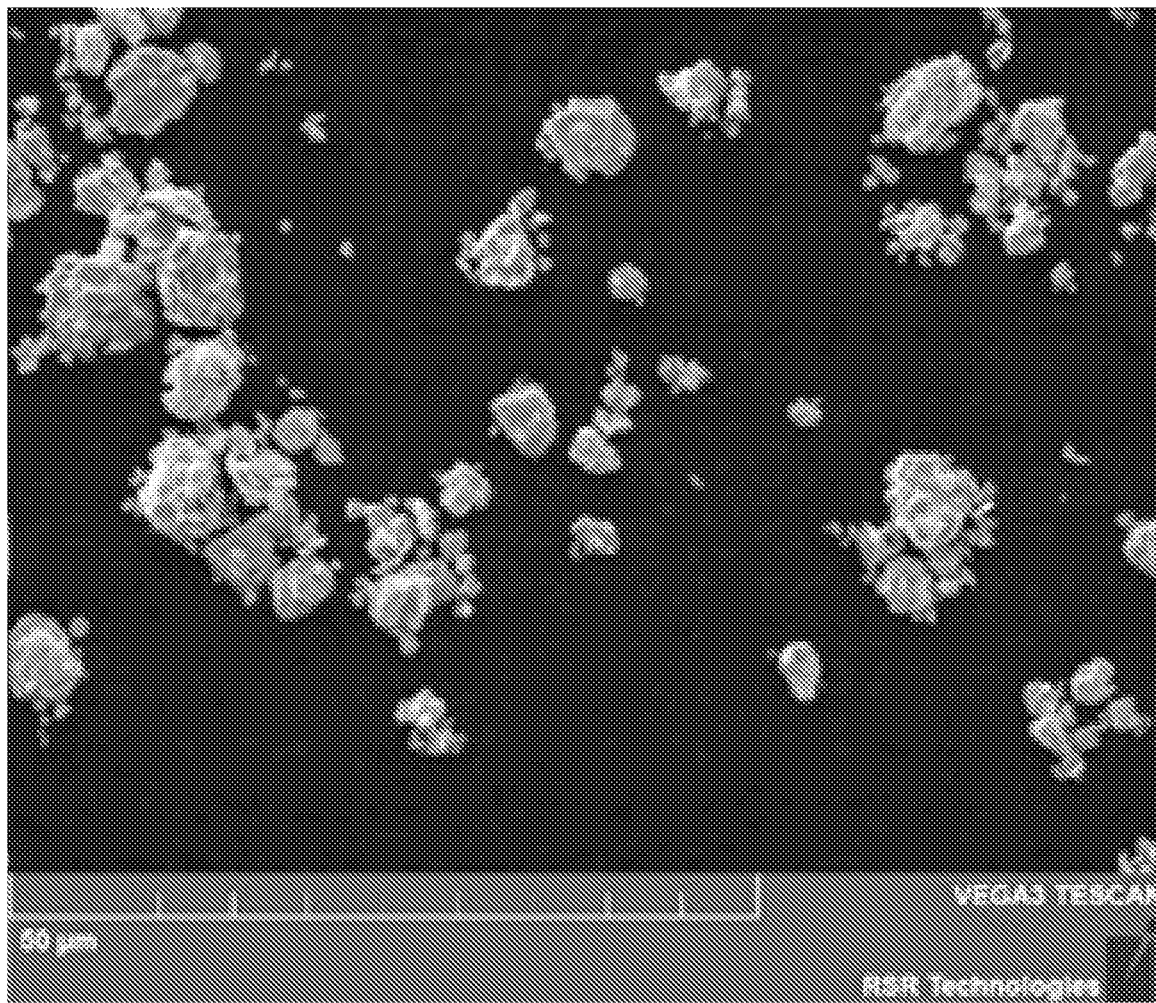
FIG. 4 is a scanning electron micrograph of a doped leady oxide powder produced from the lead-based alloy described in this specification.

Lead-based alloy produced in accordance with Example 1 was heated to a temperature in the range of 675° F. to 700° F. (357-371° C.) to melt the alloy. The molten alloy was fed to a Barton pot reactor operating with an agitator speed in the range of 150-500 RPM and an air blower operating in the range of 44-49 Hertz. The Barton process produced a doped leady oxide powder comprising particles with a mean non-agglomerated particle size of 3.1 micrometers determined using a Microtrac S3000 Laser Diffraction Particle Size Analyzer. The chemical composition of the doped leady oxide powder was measured using inductively coupled plasma optical emission spectrometry (ICP-OES). The chemical compositions of two different lots (Examples 2a and 2b) of the doped leady oxide powder measured using ICP-OES is provided below in Table 5. The doped leady oxide powder comprised 82.75% doped lead oxides ($PbO_x$) and 17.25% metallic lead-based alloy. The morphology of the doped leady oxide powder particles was evaluated using scanning electron microscopy (SEM). A representative micrograph is shown in FIG. 4.

TABLE 5

| Doped Leady Oxide Powder Composition (ppm by total weight) | | |
|---|---|---|
| Element | Example 2a | Ex-2b |
| Bi | 131.0 | 116.4 |
| Sb | 76.0 | 76.0 |
| As | 54.5 | 53.8 |
| Sn | 26.7 | 16.2 |
| Ag | 36.9 | 33.5 |

TABLE 5-continued

Doped Leady Oxide Powder
Composition (ppm by total weight)

| Element | Example 2a | Ex-2b |
|---|---|---|
| Al | 10.1 | <1.0 |
| B | <10.0 | <10.0 |
| Ba | <1.0 | <1.0 |
| Ca | <10.0 | <10.0 |
| Cd | <1.0 | <1.0 |
| Co | <1.0 | <1.0 |
| Cr | <1.0 | <1.0 |
| Cu | <1.0 | <1.0 |
| Fe | 8.4 | 6.4 |
| K | <1.0 | <1.0 |
| Mg | 3.6 | 2.9 |
| Mn | <1.0 | <1.0 |
| Na | <10.0 | <10.0 |
| Ni | <1.0 | <1.0 |
| S | <10.0 | <10.0 |
| Se | <5.0 | <5.0 |
| Si | <5.0 | <5.0 |
| Sr | <1.0 | <1.0 |
| Te | 3.2 | <1.0 |
| Ti | <1.0 | <1.0 |
| Zn | <1.0 | <1.0 |
| Pb + O | balance | balance |

Example 3: Production of Positive Plate Electrodes

Doped leady oxide powder produced in accordance with Example 2 was used to formulate precursor pastes for positive electrode active material. About 1000 grams of the doped leady oxide powder was mixed with about 2 grams of polyester fiber for about two minutes in a double planetary mixer equipped with a 1.5 liter bowl and operating at 25 Hertz. About 110 milliliters of deionized water was added to the mixture of doped leady oxide powder and polyester fiber and stirred for about one minute in the double planetary mixer operating at 35 Hertz. About 80 milliliters of 50% (w/w) sulfuric acid aqueous solution (1.400 specific gravity at 60.0° F./15.6° C.) was added dropwise to the mixture of doped leady oxide powder, polyester fiber, and deionized water over a period of about 5 minutes while mixing in the double planetary mixer operating at 35 Hertz. After all of the sulfuric acid aqueous solution was added, the mixing was continued in the double planetary mixer operating at 35 Hertz for about an additional two minutes.

The resulting precursor paste was manually pasted onto lead-tin-calcium-aluminum alloy grids. The pasted grids were cured/hydroset in temperature- and humidity-controlled chamber using a two-step procedure. In the first step, the pasted grids were heated at 54.4° C. and 90% relative humidity for about 12 hours, and in the second (subsequent) step, the pasted grids were heated at 60° C. and 50% relative humidity for about 14 hours.

The cured/hydroset plates were electrochemically formed in a three-step process. Positive plates and negative plates (see Example 4) were formed together in sulfuric acid baths. In the first step, the plates were formed with a 1 Ampere current applied for 5 hours in a 1.08 specific gravity (11%) sulfuric acid bath at a 5 Amp-hour rate. In the second step, the formation was continued with a 0.35 Ampere current applied for 23 hours in a 1.285 specific gravity (37%) sulfuric acid bath at a 3 Amp-hour rate. In the third step, the formation was completed with a 0.2 Ampere current applied for 20 hours in a 1.285 specific gravity (37%) sulfuric acid bath in a trickle charging mode.

Example 4: Production of Negative Plate Electrodes

Doped leady oxide powder produced in accordance with Example 2 was used to formulate precursor pastes for negative electrode active material. About 1000 grams of the doped leady oxide powder was mixed with about 2 grams of polyester fiber and about 10 grams of K2 additive package available from Hammond Group Inc., Hammond, Ind., USA. The combined components were mixed for about two minutes in a double planetary mixer equipped with a 1.5 liter bowl and operating at 25 Hertz. About 110 milliliters of deionized water was added to the mixture of doped leady oxide powder and polyester fiber and stirred for about one minute in the double planetary mixer operating at 35 Hertz. About 80 milliliters of 50% (w/w) sulfuric acid aqueous solution (1.400 specific gravity at 60.0° F./15.6° C.) was added dropwise to the mixture of doped leady oxide powder, polyester fiber, and deionized water over a period of about 5 minutes while mixing in the double planetary mixer operating at 35 Hertz. After all of the sulfuric acid aqueous solution was added, the mixing was continued in the double planetary mixer operating at 35 Hertz for about an additional two minutes.

The resulting precursor paste was manually pasted onto lead-tin-calcium-aluminum alloy grids. The pasted grids were cured/hydroset in temperature- and humidity-controlled chamber using a two-step procedure. In the first step, the pasted grids were heated at 54.4° C. and 90% relative humidity for about 12 hours, and in the second (subsequent) step, the pasted grids were heated at 60° C. and 50% relative humidity for about 14 hours.

The cured/hydroset plates were electrochemically formed in a three-step process. Positive plates and negative plates (see Example 3) were formed together in sulfuric acid baths. In the first step, the plates were formed with a 1 Ampere current applied for 5 hours in a 1.08 specific gravity (11%) sulfuric acid bath at a 5 Amp-hour rate. In the second step, the formation was continued with a 0.35 Ampere current applied for 23 hours in a 1.285 specific gravity (37%) sulfuric acid bath at a 3 Amp-hour rate. In the third step, the formation was completed with a 0.2 Ampere current applied for 20 hours in a 1.285 specific gravity (37%) sulfuric acid bath in a trickle charging mode.

Example 5: Production of Lead-Acid Test Cells

Figure 5:
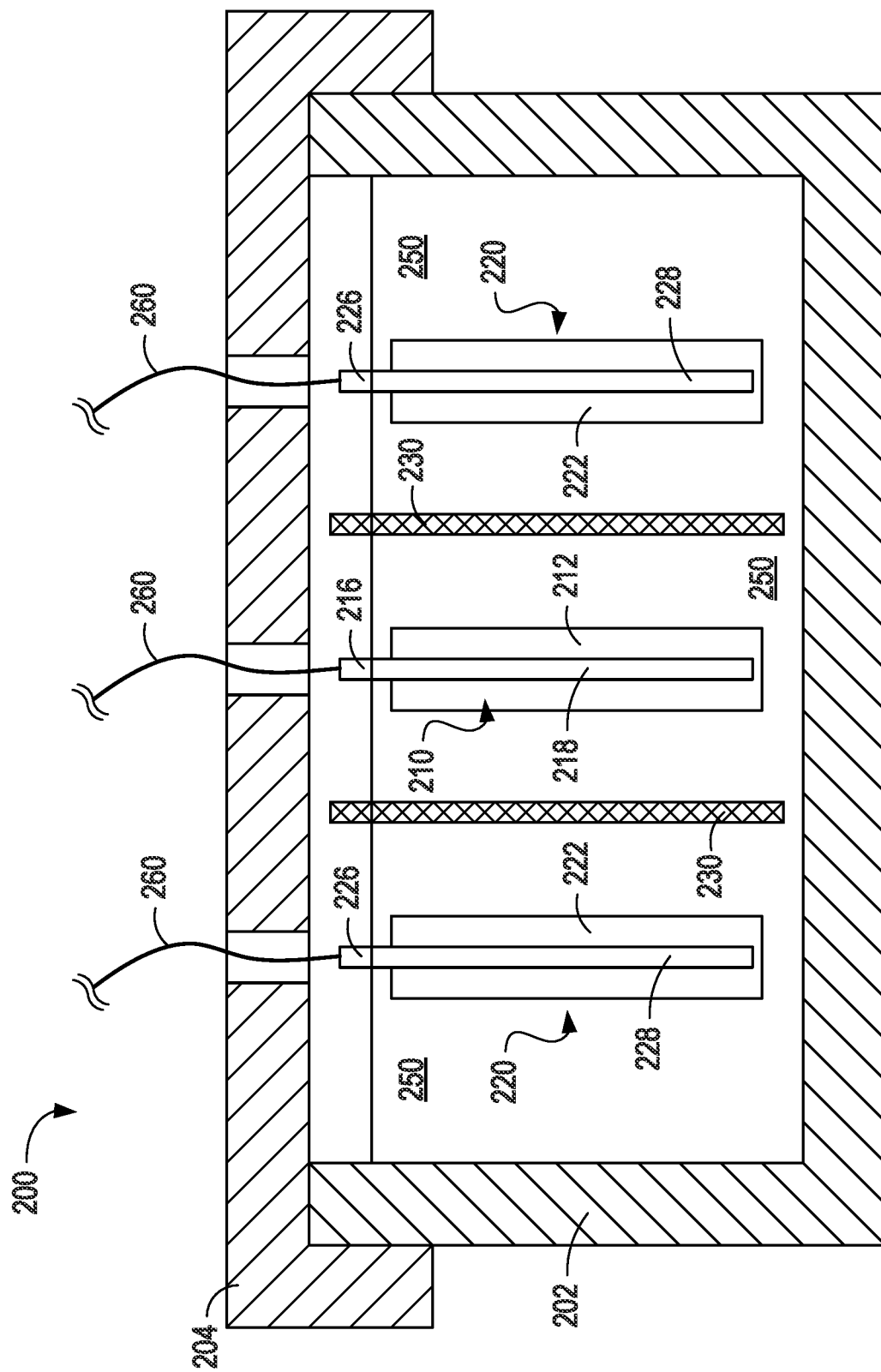
FIG. 5 is a cross-sectional schematic diagram of a lead-acid test cell used in certain examples described below to test the performance of plate electrodes produced using a doped leady oxide powder produced from the lead-based alloy described in this specification.

Lead-acid test cells were constructed as illustrated in FIG. 5. Each test cell 200 comprised a plastic (polypropylene) casing 202 and a plastic (polypropylene) lid 204. A central plate electrode 210 was positioned between two peripheral plate electrodes 220. In tests designed to assess the performance of an experimental positive plate electrode produced in accordance with Example 3, the experimental positive plate electrode was positioned as the central plate electrode 210 (i.e., in the central position), and the two negative plate electrodes were positioned as the peripheral plate electrodes 220 (i.e., in the peripheral positions). In tests designed to assess the performance of an experimental negative plate electrode produced in accordance with Example 4, the experimental negative plate electrode was positioned as the central plate electrode 210 (i.e., in the central position), and the two positive plate electrodes were positioned as the peripheral plate electrodes 220 (i.e., in the peripheral positions).

The central plate electrode 210 comprised electrode active material 212, which was previously cured/hydroset on an underlying lead-tin-calcium-aluminum alloy grid 218 in accordance with the procedures described above in Examples 3 and 4. Similarly, the peripheral plate electrodes 220 each comprised electrode active material 222, which was previously cured/hydroset on an underlying lead-tin-calcium-aluminum alloy grid 228 in accordance with the procedures described above in Examples 3 and 4. The central plate electrode 210 was separated from each peripheral plate electrode 220 by glass fiber mats 230.

The central plate electrode 210 comprised a tab 216 connected to the lead-tin-calcium-aluminum alloy grid 218, and the two peripheral plate electrodes 220 each comprised tabs 226 connected to the lead-tin-calcium-aluminum alloy grids 228. The tabs 216 and 226 were connected via lines 260 to a Maccor Model 4300 Desktop Automatic Test System, available from Maccor, Inc., Tulsa, Okla., USA.

Each test cell 200 was filled with sulfuric acid electrolyte 250 immediately before performing the three-step formation process described above in Examples 3 and 4. The formation operation was performed with the casing 202 open to atmosphere (the lid 204 was not placed on top of the casing 202 until after completion of the formation process and before the performance of the testing described below in Examples 7B-7H. The 1.08 specific gravity (11%) sulfuric acid was added to the open casing and the 1 Ampere current applied for 5 hours at a 5 Amp-hour rate, after which the 1.08 specific gravity sulfuric acid was drained and replaced with 1.285 specific gravity (37%) sulfuric acid. The second formation step was performed in the 1.285 specific gravity sulfuric acid with the 0.35 Ampere current applied for 23 hours at a 3 Amp-hour rate. Thereafter, the formation process was completed with the 0.2 Ampere current applied for 20 hours in the 1.285 specific gravity (37%) sulfuric acid bath in a trickle charging mode, the lid 204 was attached, and the cells 200 tested as described below in Examples 7B-7H.

The test cells were each constructed as an experimental type, a control type, or a comparative type for performance testing described below in Examples 7B-7H.

The experimental cell types comprised positive plate electrodes produced in accordance with Example 3 or negative plate electrodes produced in accordance with Example 4, or both. In examples where only the positive or negative plate electrodes comprised active material produced from doped leady oxide powder produced in accordance with Example 2, the counter electrodes were produced using Battery Litharge Automotive Grade, a conventional leady oxide powder used for automotive batteries available from Hammond Group Inc., Hammond, Ind., USA. The electrodes produced using conventional automotive battery leady oxide were produced and processed as described above in Examples 3 and 4 and, therefore, other than chemical composition, were identical to the electrodes produced from doped leady oxide powder produced in accordance with Example 2.

The control cell type comprised positive and negative plate electrodes produced and processed as described above in Examples 3 and 4, but using the conventional automotive battery leady oxide powder (Battery Litharge Automotive Grade, available from Hammond Group Inc., Hammond, Ind., USA). Accordingly, other than the chemical composition of the leady oxides used to produce the electrode plates, the control cells were produced, processed, tested, and were otherwise identical to the experimental cells.

The comparative cell types comprised positive and/or negative plate electrodes produced and processed as described above in Examples 3 and 4 but using a leady oxide powder produced from an ultra high purity secondary lead having the compositional specification shown below in Table 6. The leady oxide powder was produced from the ultra high purity secondary lead using the procedure described in Example 2.

TABLE 6

| Ultra High Purity Secondary Lead (Comparative Examples) | |
|---|---|
| Element | Parts-per-million by weight |
| Bi | ≤150 |
| Sb | ≤1 |
| As | ≤1 |
| Sn | ≤2 |
| Ag | ≤50 |
| Se | ≤1 |
| Zn | ≤1 |
| Cr | ≤1 |
| Ni | <1 |
| Cu | ≤2 |
| Te | ≤0.3 |
| Fe | ≤1 |
| Cd | <1 |
| Mn | ≤1 |
| S | ≤10 |
| Al | <5 |
| Ca | ≤10 |
| Pb + other incidental impurities | balance |

Example 6: Production of Lead-Acid Test Batteries

Test batteries (12-volts) were constructed comprising six, 2-volt cells connected in series. Each cell comprised a positive plate electrode and a negative plate electrode. The test batteries were each constructed as experimental types and a control type for performance testing described below in Example 7A.

The experimental battery types comprised positive plate electrodes, or both positive plate electrodes and negative plate electrodes, comprising active material produced from the doped leady oxide powder produced in accordance with Example 2. In examples where only the positive plate electrodes comprised active material produced from doped leady oxide powder produced in accordance with Example 2, the negative electrodes were produced using conventional automotive battery leady oxide powder (Battery Litharge Automotive Grade, available from Hammond Group Inc., Hammond, Ind., USA). The control battery type comprised positive and negative plate electrodes comprising active material produced from the conventional automotive battery leady oxide powder (Battery Litharge Automotive Grade, available from Hammond Group Inc., Hammond, Ind., USA).

In the experimental and control batter types, the doped leady oxide powder and the conventional automotive battery leady oxide powder was formulated into precursor pastes as described above in Examples 3 and 4. The positive plate electrodes were modified to include an industry standard additive mix for reserve power applications, which was added to the powders during the formulation of the precursor pastes. The precursor pastes were pasted onto lead-tin-calcium-aluminum alloy grids using an industry standard pasting machine. The pasted plates were cured/hydroset and formed in accordance with Battery Council International (BCI) standard procedures. Other than the chemical composition of the leady oxides used to produce the electrode plates, the control batteries were produced, processed, tested, and were otherwise identical to the experimental batteries.

Example 7: Testing of Lead-Acid Cells and Batteries

Test cells and batteries produced in accordance with Examples 5 and 6 were tested for the performance parameters shown in Table 7 below.

TABLE 7

Battery Performance Tests

| Test | Performance Parameter | Standard Test Procedure** |
|---|---|---|
| A | Capacity Drop Test (2 hour life cycle) | Battery Council International Standard BCIS-06 |
| B | Micro-Hybrid Test (MHT) | European Standard FprEN 50342-6:2015E |
| C | Hybrid Pulse-Power Characterization (HPPC) | Battery Council International Standard BCIS-04, 8.0 |
| D | One Hour Capacity Test | European Standard FprEN 50342-6:2015E |
| E | 20 Hour Capacity Test | Ford Engineering Specification ES-F4SF-10655-AB, 3.9 |
| F | Crank Volt | Battery Council International Standard BCIS-04, 5.3 |
| G | Crank Capacity | Battery Council International Standard BCIS-04, 5.3 |
| H | Float Current | European Standard FprEN 50342-1:2015, 6.9 |

**The identified standard test procedures are incorporated by reference into this specification.

Example 7A: Capacity Drop Test (2 Hour Life Cycle)

Figure 6:
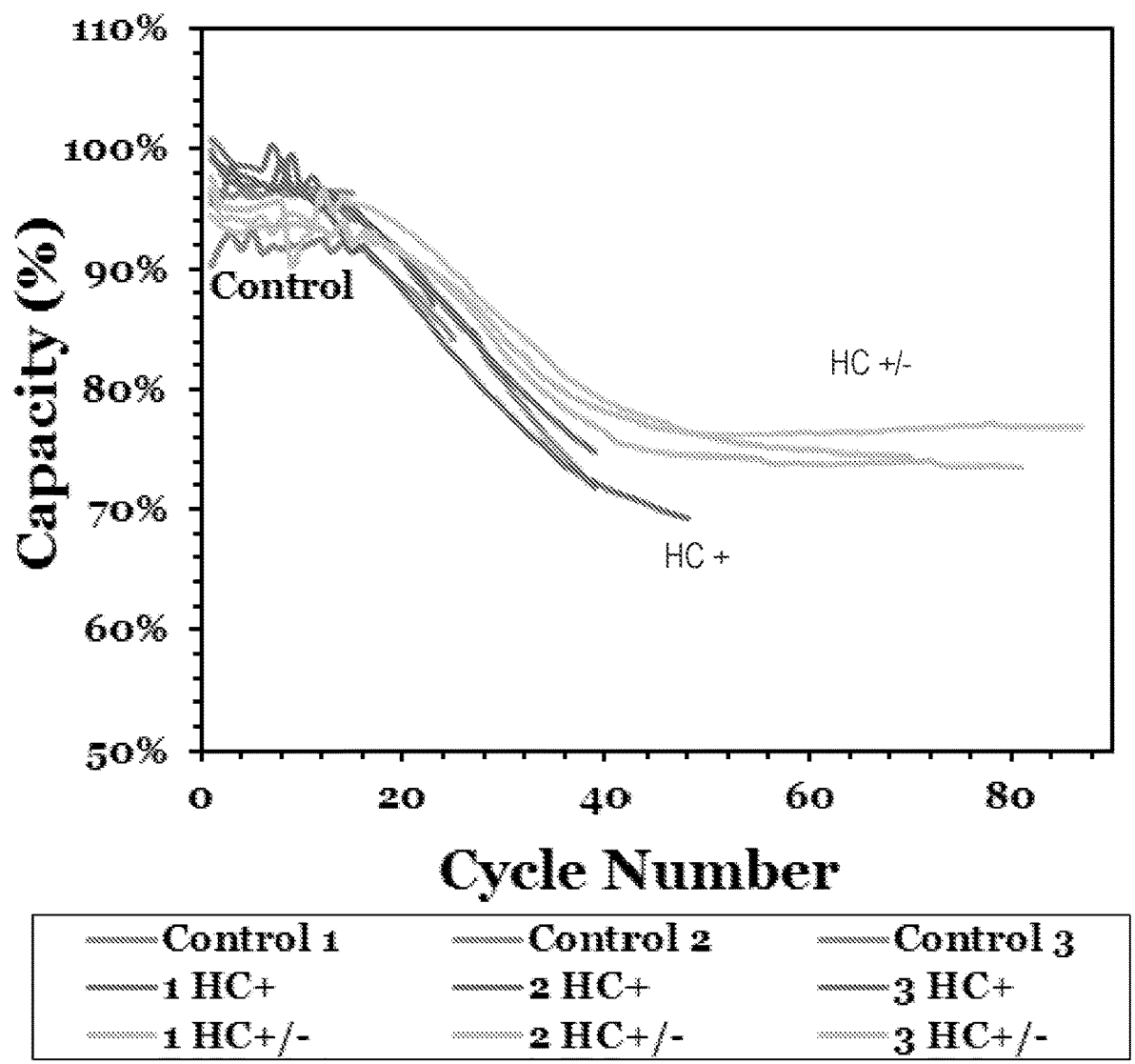
FIG. 6 is a graph of capacity drop test results (2 hour life cycle) plotting battery capacity as a function of cycle number for 12-volt batteries comprising negative and/or positive plate electrodes produced using a doped leady oxide powder produced from the lead-based alloy described in this specification.

FIG. 6 shows capacity drop test results for three 12-volt battery types produced in accordance with Example 6 (tests performed in triplicate):

(1) Control batteries comprising positive plate electrodes produced using the conventional automotive battery leady oxide powder available from Hammond Group Inc., Hammond, Ind., USA, and negative plate electrodes produced using the conventional automotive battery leady oxide powder and the K2 additive package both available from Hammond Group Inc., Hammond, Ind., USA (Control);

(2) Experimental batteries comprising positive plate electrodes produced in accordance with Example 3, and negative plate electrodes produced using the conventional automotive battery leady oxide powder and the K2 additive package both available from Hammond Group Inc., Hammond, Ind., USA (HC+); and (3) Experimental batteries comprising positive plate electrodes produced in accordance with Example 3, and negative plate electrodes produced in accordance with Example 4 with the K2 additive package available from Hammond Group Inc., Hammond, Ind., USA (HC+/−).

As shown in FIG. 6, the batteries comprising positive and negative plate electrodes produced in accordance with Examples 3 and 4 exhibited substantially superior capacity drop performance than the control batteries. Additionally, the batteries comprising positive plate electrodes produced in accordance with Example 3 and conventional negative plate electrodes on average exhibit somewhat improved capacity drop performance than the control batteries.

Specifically, the batteries comprising positive and negative plate electrodes produced in accordance with Examples 3 and 4 performed over 70 cycles (and two of the three samples performed over 80 cycles) compared to the performance range of 20-40 cycles for the control batteries. Additionally, the end of life capacity of the batteries comprising positive and negative plate electrodes produced in accordance with Examples 3 and 4 was approximately 10% greater than the longest cycling control battery.

These results show that batteries comprising positive and negative plate electrodes produced using doped leady oxide powders produced from the lead-based alloys described in this specification exhibit substantially longer cycle lives and increased end-of-life capacity than conventional batteries.

Example 7B: MHT Test

Figure 7:
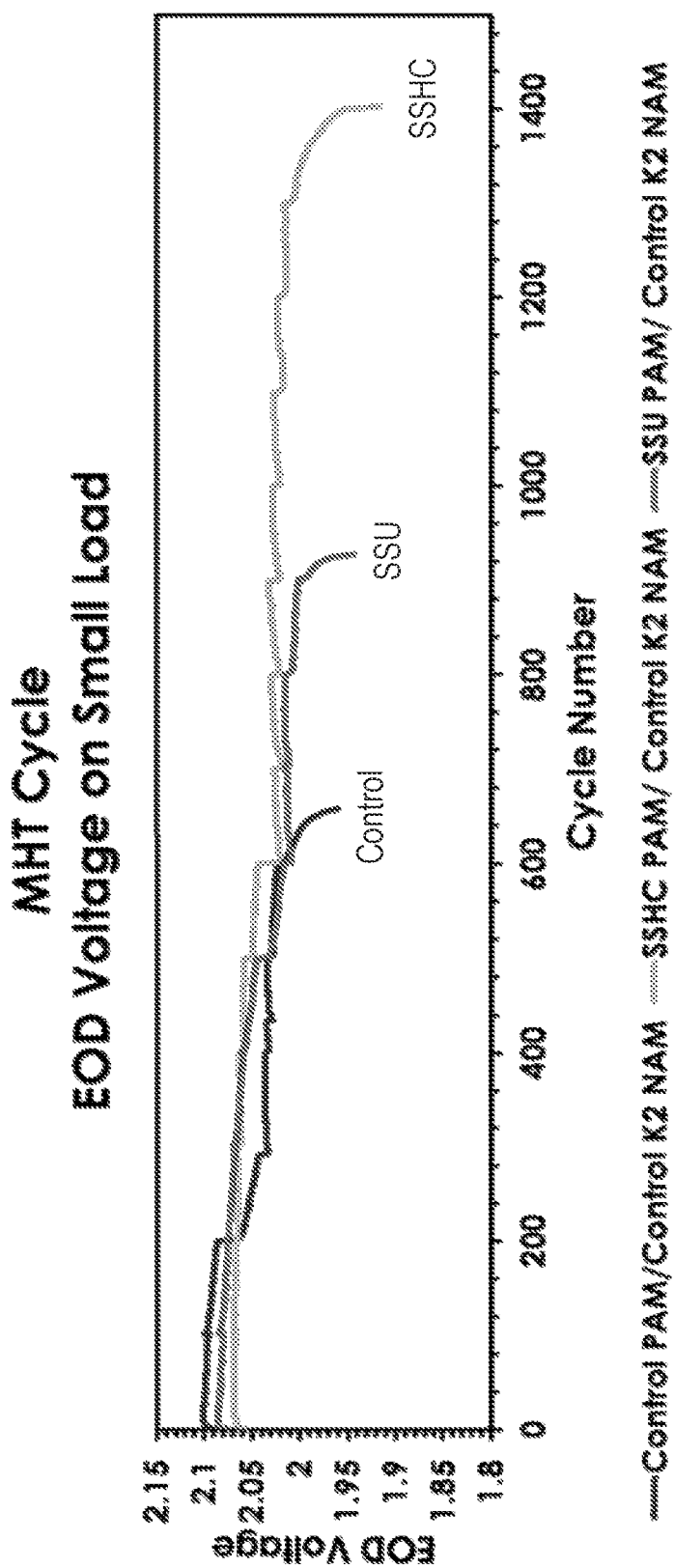
FIG. 7 is a graph of micro-hybrid test (MHT) results plotting end of discharge voltage as a function of cycle number for test cells comprising positive plate electrodes produced using a doped leady oxide powder produced from the lead-based alloy described in this specification.

FIG. 7 shows MHT results for three cell types produced in accordance with Example 5 having the positive plate electrode located in the central position and the two negative plate electrodes located in the peripheral position (all three employed negative plate electrodes produced using the conventional automotive battery leady oxide powder and the K2 additive package, both available from Hammond Group Inc., Hammond, Ind., USA):

(1) Control cells comprising positive plate electrodes produced using the conventional automotive battery leady oxide powder available from Hammond Group Inc., Hammond, Ind., USA (Control);

(2) Comparative cells comprising positive plate electrodes produced using leady oxide powder produced from the ultra high purity secondary lead (SSU); and (3) Experimental cells comprising positive plate electrodes produced in accordance with Example 3 (SSHC).

As shown in FIG. 7, the cell comprising positive plate electrodes produced in accordance with Example 3 exhibited substantially superior cycling performance than the control cell and the comparative cell. Specifically, the cell comprising positive plate electrodes produced in accordance with Example 3 outperformed the comparative cell comprising positive plate electrodes produced using leady oxide produced from the ultra high purity secondary lead by 500 cycles, corresponding to an approximately 50% longer cycle life. The cell comprising positive plate electrodes produced in accordance with Example 3 outperformed the control cell by more than 700 cycles, corresponding to an approximately 100% longer cycle life.

These results indicate that batteries comprising positive plate electrodes produced using doped leady oxide powders produced from the lead-based alloys described in this specification will exhibit substantially longer cycle lives than conventional batteries.

Example 7C: HPPC Test

Figure 8:
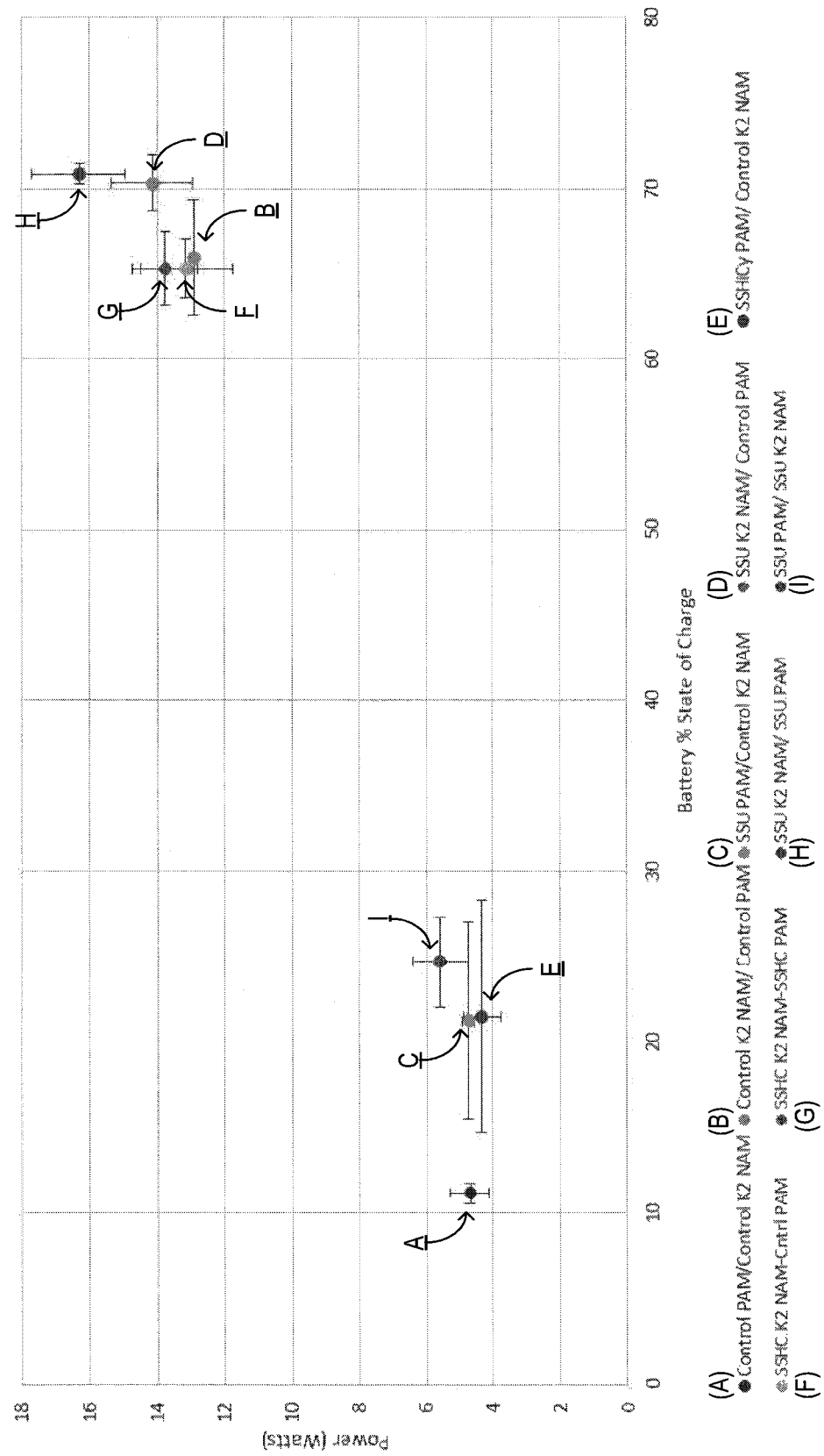
FIG. 8 is a graph of hybrid pulse-power characterization (HPPC) test results plotting charge/discharge power cross point as a function of state of charge for test cells comprising negative and/or positive plate electrodes produced using a doped leady oxide powder produced from the lead-based alloy described in this specification.

FIG. 8 shows HPPC test results for seven cell types produced in accordance with Example 5:

(1) Control cells comprising positive plate electrodes produced using the conventional automotive battery leady oxide powder available from Hammond Group Inc., Hammond, Ind., USA, and negative plate electrodes produced using the conventional automotive battery leady oxide powder and the K2 additive package, both available from Hammond Group Inc., Hammond, Ind., USA (Control/Control);

(2) Comparative cells comprising positive plate electrodes produced using leady oxide powder produced from the ultra high purity secondary lead, and negative plate electrodes produced using the conventional automotive battery leady oxide powder and the K2 additive package, both available from Hammond Group Inc., Hammond, Ind., USA (SSU PAM/Control K2 NAM);

(3) Comparative cells comprising positive plate electrodes produced using the conventional automotive battery leady oxide powder available from Hammond Group Inc., Hammond, Ind., USA, and negative plate electrodes produced using leady oxide powder produced from the ultra high purity secondary lead and the K2 additive package available from Hammond Group Inc., Hammond, Ind., USA (Control PAM/SSU K2 NAM).

(4) Comparative cells comprising positive plate electrodes produced using leady oxide powder produced from the ultra high purity secondary lead, and negative plate electrodes produced using leady oxide powder produced from the ultra high purity secondary lead and the K2 additive package available from Hammond Group Inc., Hammond, Ind., USA (SSU/SSU);

(5) Experimental cells comprising positive plate electrodes produced in accordance with Example 3, and negative plate electrodes produced using the conventional automotive battery leady oxide powder and the K2 additive package, both available from Hammond Group Inc., Hammond, Ind., USA (SSHC PAM/Control K2 NAM);

(6) Experimental cells comprising positive plate electrodes produced using the conventional automotive battery leady oxide powder available from Hammond Group Inc., Hammond, Ind., USA, and negative plate electrodes produced in accordance with Example 4 with the K2 additive package available from Hammond Group Inc., Hammond, Ind., USA (Control PAM/SSHC K2 NAM); and (7) Experimental cells comprising positive plate electrodes produced in accordance with Example 3, and negative plate electrodes produced in accordance with Example 4 with the K2 additive package available from Hammond Group Inc., Hammond, Ind., USA (SSHC PAM/SSHC K2 NAM).

The group of charge/discharge power cross points on the left-hand side of FIG. 8 (~10-25% state of charge) correspond to test cells having the positive plate electrode located in the central position and the two negative plate electrodes located in the peripheral position. The group of charge/discharge power cross points on the right-hand side of FIG. 8 (~65-72% state of charge) correspond to test cells having the negative plate electrode located in the central position and the two positive plate electrodes located in the peripheral position.

As shown in FIG. 8, the cell types exhibited comparable HPPC performance. These results indicate that batteries comprising positive and/or negative plate electrodes produced using doped leady oxide powders produced from the lead-based alloys described in this specification will not exhibit any reduced performance compared to batteries comprising conventional or ultra high purity active materials in hybrid automotive applications.

Example 7D: One Hour Capacity Test

Figure 9A:
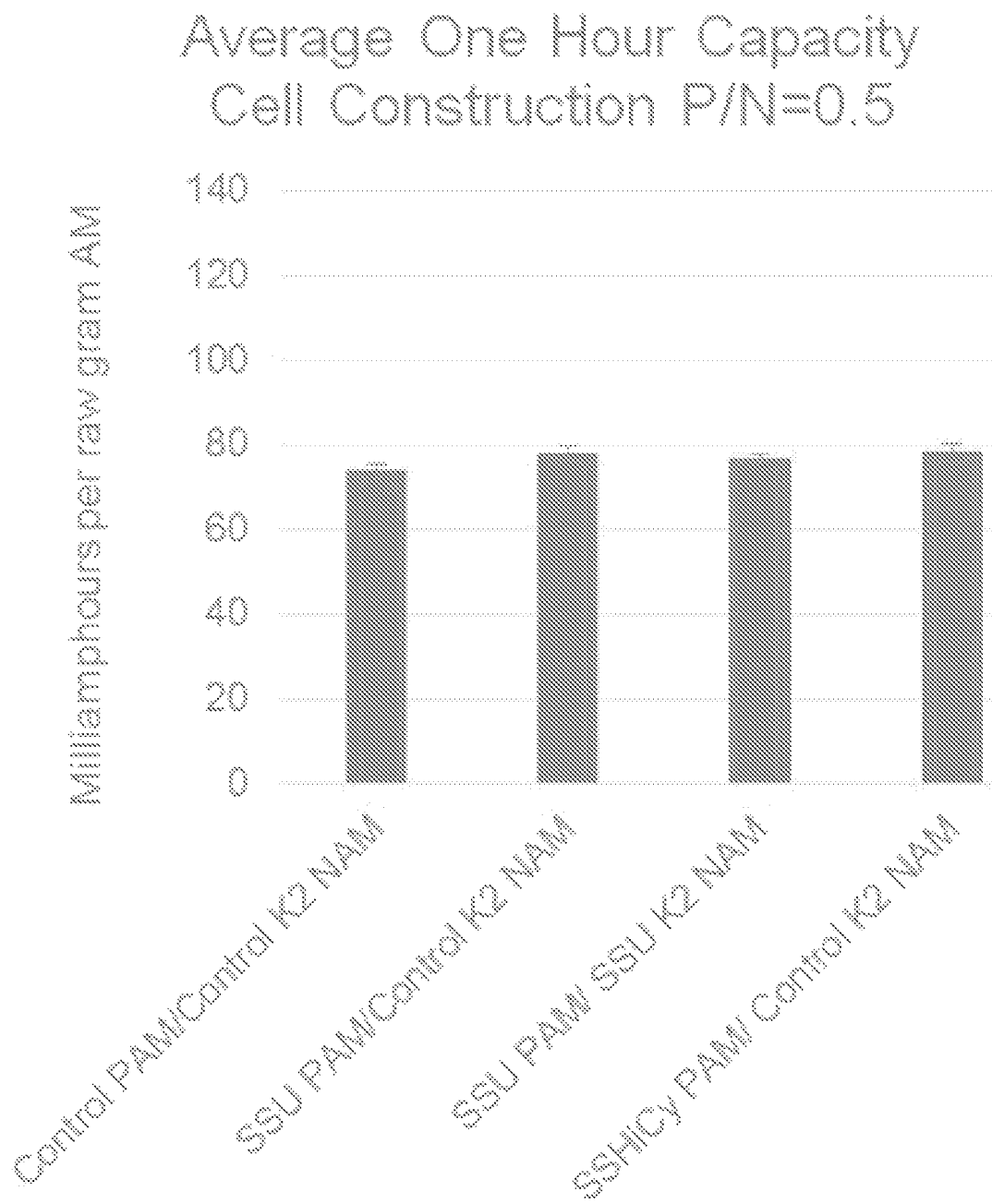
FIGS. 9A and 9B are bar graphs of one hour capacity test results for test cells comprising positive and/or negative plate electrodes produced using a doped leady oxide powder produced from the lead-based alloy described in this specification.
Figure 9B:
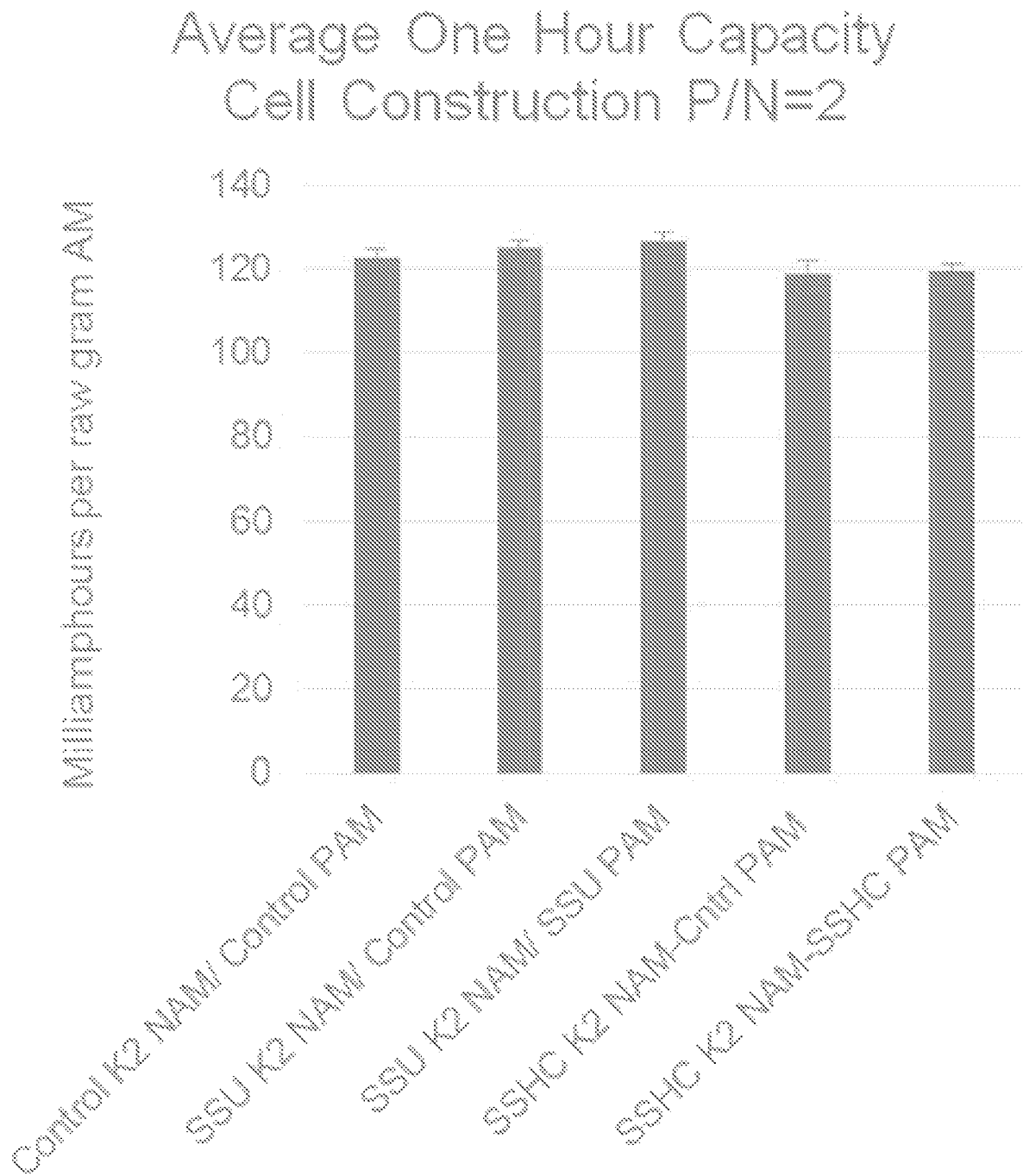

FIGS. 9A and 9B show one hour capacity test results for seven cell types produced in accordance with Example 5:

(1) Control cells comprising positive plate electrodes produced using the conventional automotive battery leady oxide powder available from Hammond Group Inc., Hammond, Ind., USA, and negative plate electrodes produced using the conventional automotive battery leady oxide powder and the K2 additive package, both available from Hammond Group Inc., Hammond, Ind., USA (Control/Control);

(2) Comparative cells comprising positive plate electrodes produced using leady oxide powder produced from the ultra high purity secondary lead, and negative plate electrodes produced using the conventional automotive battery leady oxide powder and the K2 additive package, both available from Hammond Group Inc., Hammond, Ind., USA (SSU PAM/Control K2 NAM);

(3) Comparative cells comprising positive plate electrodes produced using the conventional automotive battery leady oxide powder available from Hammond Group Inc., Hammond, Ind., USA, and negative plate electrodes produced using leady oxide powder produced from the ultra high purity secondary lead and the K2 additive package available from Hammond Group Inc., Hammond, Ind., USA (Control PAM/SSU K2 NAM).

(4) Comparative cells comprising positive plate electrodes produced using leady oxide powder produced from the ultra high purity secondary lead, and negative plate electrodes produced using leady oxide powder produced from the ultra high purity secondary lead and the K2 additive package available from Hammond Group Inc., Hammond, Ind., USA (SSU/SSU);

(5) Experimental cells comprising positive plate electrodes produced in accordance with Example 3, and negative plate electrodes produced using the conventional automotive battery leady oxide powder and the K2 additive package, both available from Hammond Group Inc., Hammond, Ind., USA (SSHC PAM/Control K2 NAM);

(6) Experimental cells comprising positive plate electrodes produced using the conventional automotive battery leady oxide powder available from Hammond Group Inc., Hammond, Ind., USA, and negative plate electrodes produced in accordance with Example 4 with the K2 additive package available from Hammond Group Inc., Hammond, Ind., USA (Control PAM/SSHC K2 NAM); and (7) Experimental cells comprising positive plate electrodes produced in accordance with Example 3, and negative plate electrodes produced in accordance with Example 4 with the K2 additive package available from Hammond Group Inc., Hammond, Ind., USA (SSHC PAM/SSHC K2 NAM).

FIG. 9A shows results for test cells having the positive plate electrode located in the central position and the two negative plate electrodes located in the peripheral position. FIG. 9B shows results for test cells having the negative plate electrode located in the central position and the two positive plate electrodes located in the peripheral position.

As shown in FIGS. 9A and 9B, the cell types exhibited comparable one hour capacity performance. These results indicate that batteries comprising positive and/or negative plate electrodes produced using doped leady oxide powders produced from the lead-based alloys described in this specification will not exhibit any reduced capacity performance compared to batteries comprising conventional or ultra high purity active materials.

Example 7E: 20 Hour Capacity Test

Figure 10A:
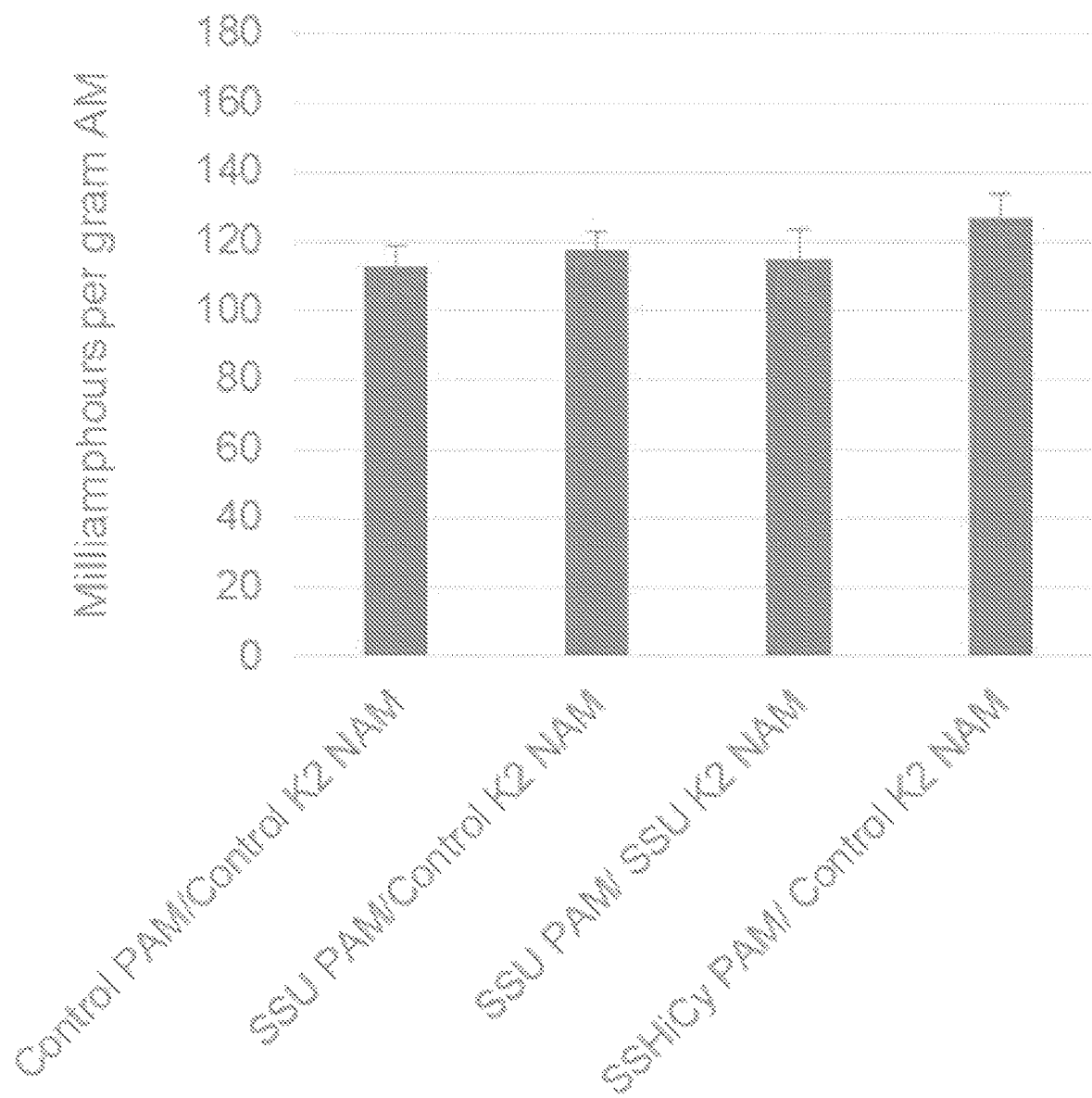
FIGS. 10A and 10B are bar graphs of twenty hour capacity test results for test cells comprising positive and/or negative plate electrodes produced using a doped leady oxide powder produced from the lead-based alloy described in this specification.
Figure 10B:
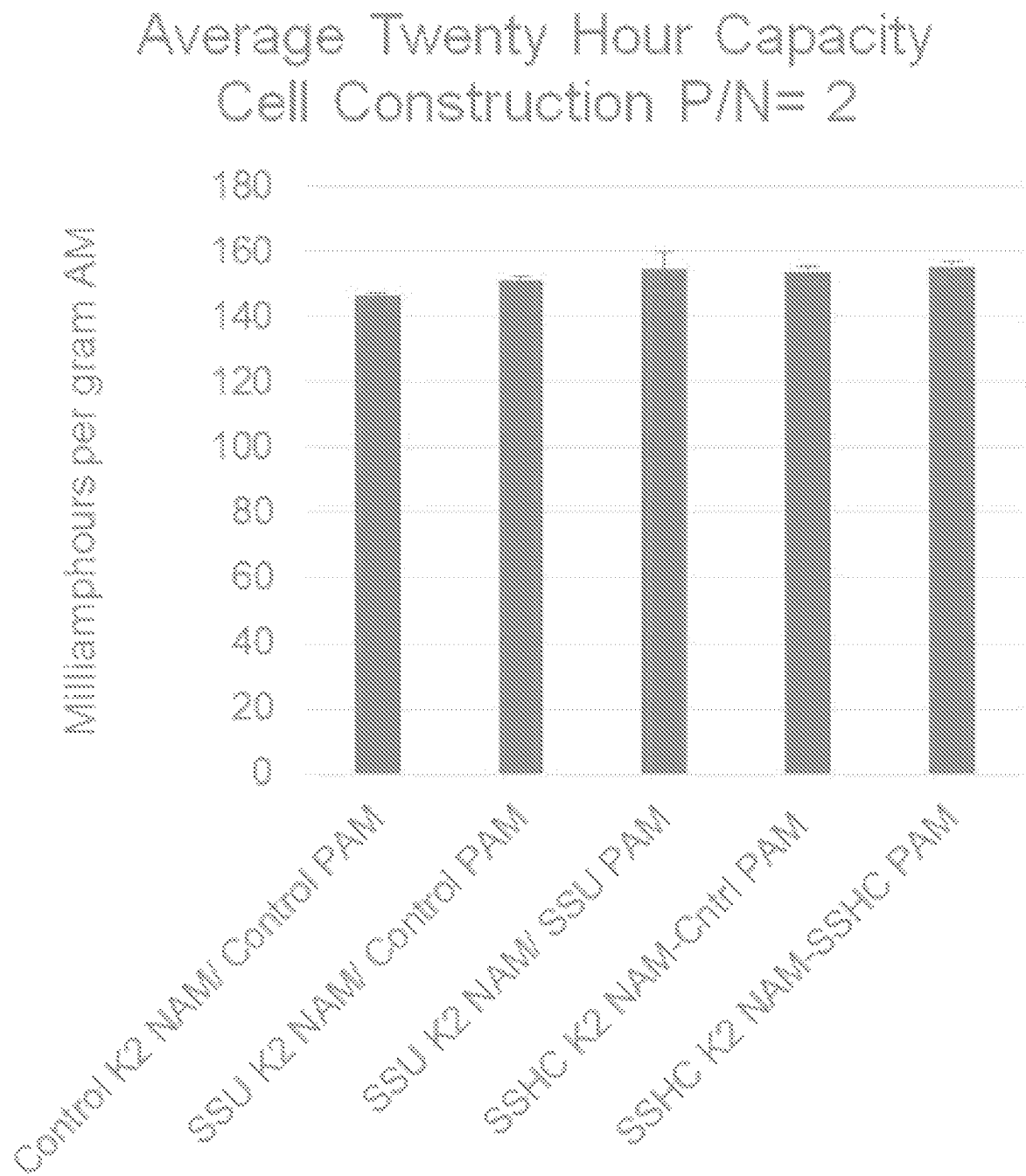

FIGS. 10A and 10B show twenty hour capacity test results for seven cell types produced in accordance with Example 5:
(1) Control cells comprising positive plate electrodes produced using the conventional automotive battery leady oxide powder available from Hammond Group Inc., Hammond, Ind., USA, and negative plate electrodes produced using the conventional automotive battery leady oxide powder and the K2 additive package, both available from Hammond Group Inc., Hammond, Ind., USA (Control/Control);
(2) Comparative cells comprising positive plate electrodes produced using leady oxide powder produced from the ultra high purity secondary lead, and negative plate electrodes produced using the conventional automotive battery leady oxide powder and the K2 additive package, both available from Hammond Group Inc., Hammond, Ind., USA (SSU PAM/Control K2 NAM);
(3) Comparative cells comprising positive plate electrodes produced using the conventional automotive battery leady oxide powder available from Hammond Group Inc., Hammond, Ind., USA, and negative plate electrodes produced using leady oxide powder produced from the ultra high purity secondary lead and the K2 additive package available from Hammond Group Inc., Hammond, Ind., USA (Control PAM/SSU K2 NAM).
(4) Comparative cells comprising positive plate electrodes produced using leady oxide powder produced from the ultra high purity secondary lead, and negative plate electrodes produced using leady oxide powder produced from the ultra high purity secondary lead and the K2 additive package available from Hammond Group Inc., Hammond, Ind., USA (SSU/SSU);
(5) Experimental cells comprising positive plate electrodes produced in accordance with Example 3, and negative plate electrodes produced using the conventional automotive battery leady oxide powder and the K2 additive package, both available from Hammond Group Inc., Hammond, Ind., USA (SSHC PAM/Control K2 NAM);
(6) Experimental cells comprising positive plate electrodes produced using the conventional automotive battery leady oxide powder available from Hammond Group Inc., Hammond, Ind., USA, and negative plate electrodes produced in accordance with Example 4 with the K2 additive package available from Hammond Group Inc., Hammond, Ind., USA (Control PAM/SSHC K2 NAM); and
(7) Experimental cells comprising positive plate electrodes produced in accordance with Example 3, and negative plate electrodes produced in accordance with Example 4 with the K2 additive package available from Hammond Group Inc., Hammond, Ind., USA (SSHC PAM/SSHC K2 NAM).

FIG. 10A shows results for test cells having the positive plate electrode located in the central position and the two negative plate electrodes located in the peripheral position. FIG. 10B shows results for test cells having the negative plate electrode located in the central position and the two positive plate electrodes located in the peripheral position.

As shown in FIGS. 10A and 10B, the cell types exhibited comparable twenty hour capacity performance. These results indicate that batteries comprising positive and/or negative plate electrodes produced using doped leady oxide powders produced from the lead-based alloys described in this specification will not exhibit any reduced capacity performance compared to batteries comprising conventional or ultra high purity active materials.

Example 7F: Crank Voltage Test

Figure 11A:
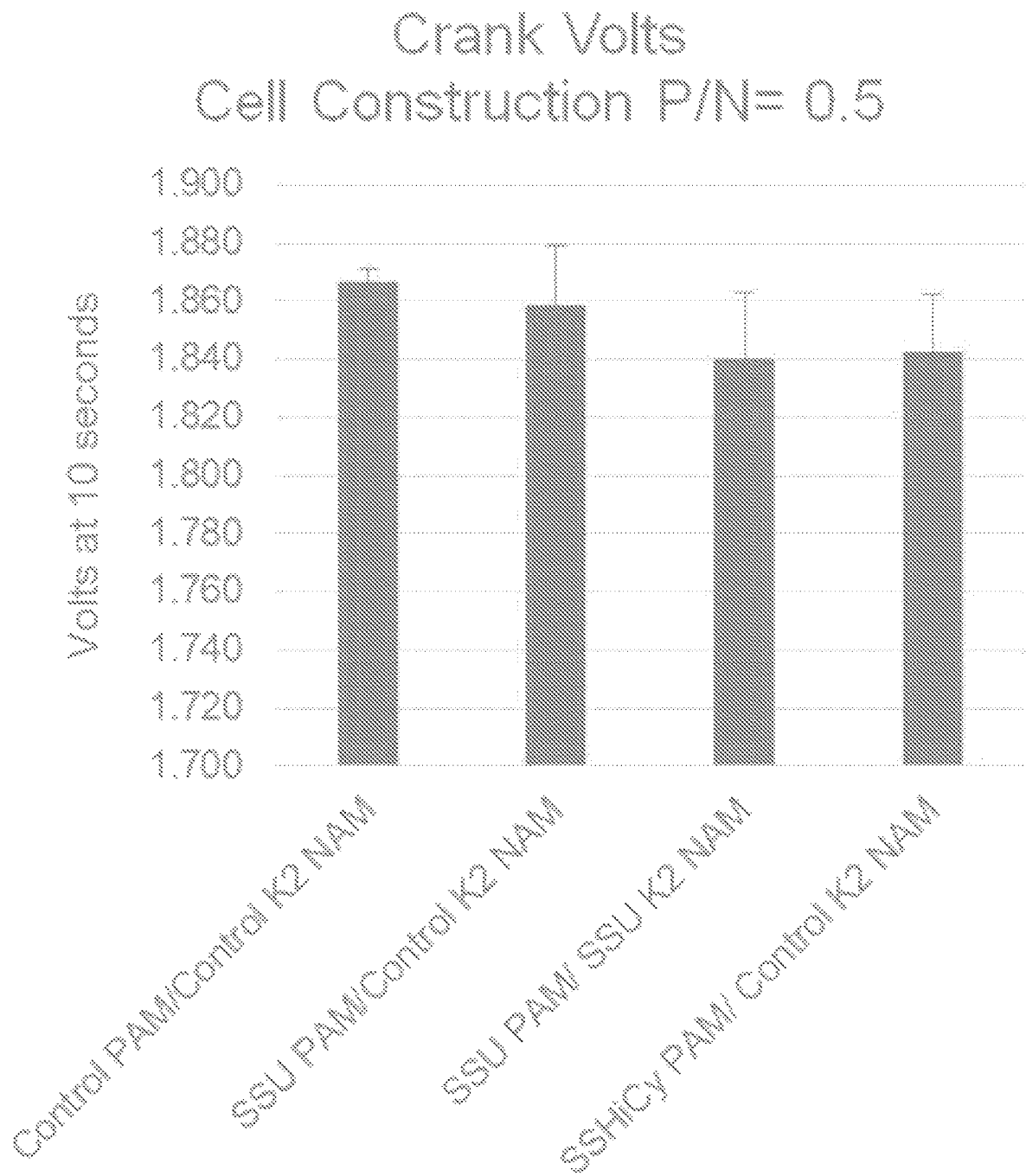
FIGS. 11A and 11B are bar graphs of crank voltage test results for test cells comprising positive and/or negative plate electrodes produced using a doped leady oxide powder produced from the lead-based alloy described in this specification.
Figure 11B:
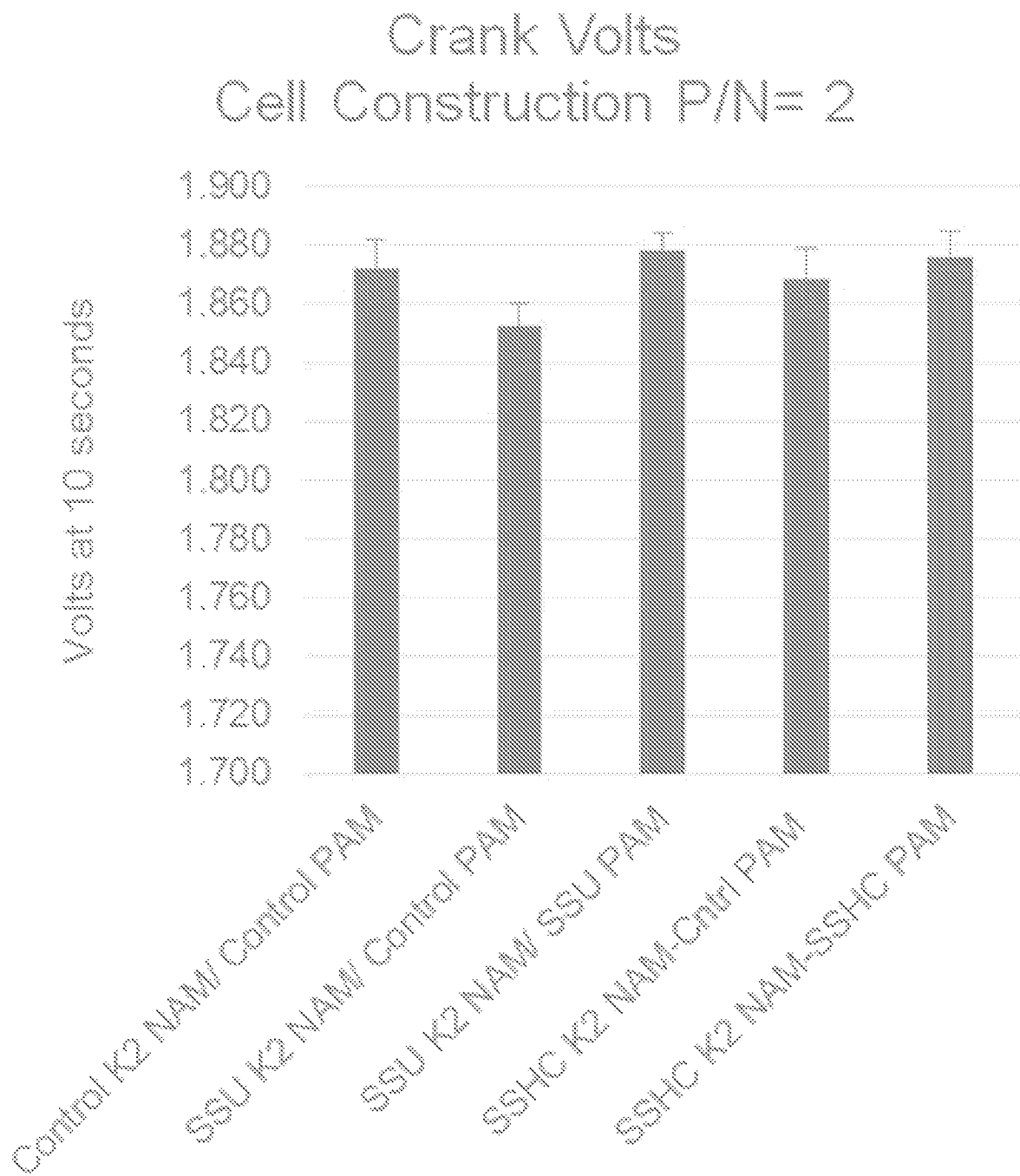

FIGS. 11A and 11B show crank voltage test results for seven cell types produced in accordance with Example 5:
(1) Control cells comprising positive plate electrodes produced using the conventional automotive battery leady oxide powder available from Hammond Group Inc., Hammond, Ind., USA, and negative plate electrodes produced using the conventional automotive battery leady oxide powder and the K2 additive package, both available from Hammond Group Inc., Hammond, Ind., USA (Control/Control);
(2) Comparative cells comprising positive plate electrodes produced using leady oxide powder produced from the ultra high purity secondary lead, and negative plate electrodes produced using the conventional automotive battery leady oxide powder and the K2 additive package, both available from Hammond Group Inc., Hammond, Ind., USA (SSU PAM/Control K2 NAM);
(3) Comparative cells comprising positive plate electrodes produced using the conventional automotive battery leady oxide powder available from Hammond Group Inc., Hammond, Ind., USA, and negative plate electrodes produced using leady oxide powder produced from the ultra high purity secondary lead and the K2 additive package available from Hammond Group Inc., Hammond, Ind., USA (Control PAM/SSU K2 NAM).
(4) Comparative cells comprising positive plate electrodes produced using leady oxide powder produced from the ultra high purity secondary lead, and negative plate electrodes produced using leady oxide powder produced from the ultra high purity secondary lead and the K2 additive package available from Hammond Group Inc., Hammond, Ind., USA (SSU/SSU);
(5) Experimental cells comprising positive plate electrodes produced in accordance with Example 3, and negative plate electrodes produced using the conventional automotive battery leady oxide powder and the K2 additive package, both available from Hammond Group Inc., Hammond, Ind., USA (SSHC PAM/Control K2 NAM);
(6) Experimental cells comprising positive plate electrodes produced using the conventional automotive battery leady oxide powder available from Hammond Group Inc., Hammond, Ind., USA, and negative plate electrodes produced in accordance with Example 4 with the K2 additive package available from Hammond Group Inc., Hammond, Ind., USA (Control PAM/SSHC K2 NAM); and
(7) Experimental cells comprising positive plate electrodes produced in accordance with Example 3, and negative plate electrodes produced in accordance with Example 4 with the K2 additive package available from Hammond Group Inc., Hammond, Ind., USA (SSHC PAM/SSHC K2 NAM).

FIG. 11A shows results for test cells having the positive plate electrode located in the central position and the two negative plate electrodes located in the peripheral position. FIG. 11B shows results for test cells having the negative plate electrode located in the central position and the two positive plate electrodes located in the peripheral position.

As shown in FIGS. 11A and 11B, the cell types exhibited comparable crank voltage performance. These results indicate that batteries comprising positive and/or negative plate electrodes produced using doped leady oxide powders produced from the lead-based alloys described in this specification will not exhibit any reduced crank voltage performance compared to batteries comprising conventional or ultra high purity active materials.

Example 7G: Crank Capacity Test

Figure 12A:
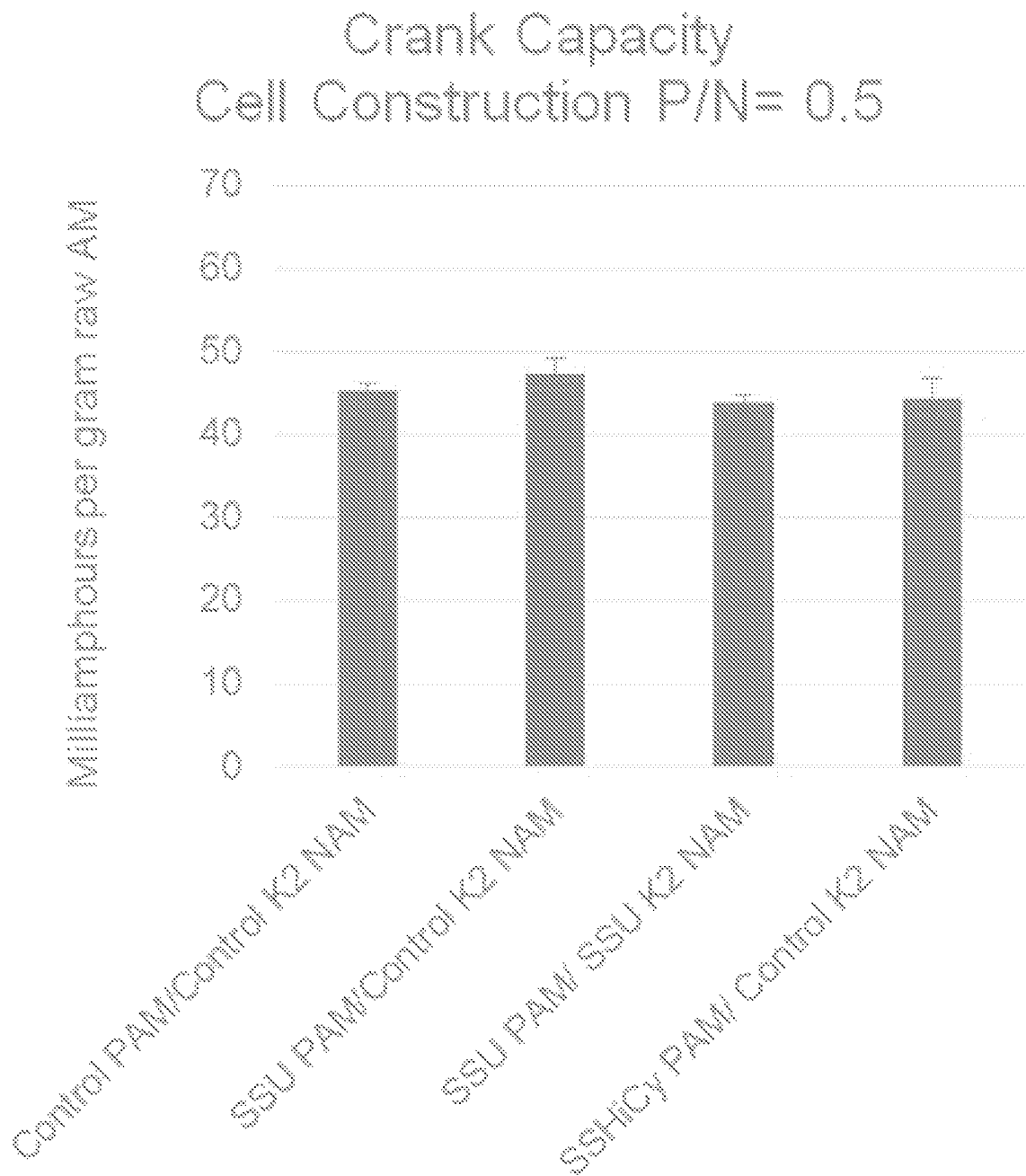
FIGS. 12A and 12B are bar graphs of crank capacity test results for test cells comprising positive and/or negative plate electrodes produced using a doped leady oxide powder produced from the lead-based alloy described in this specification.
Figure 12B:
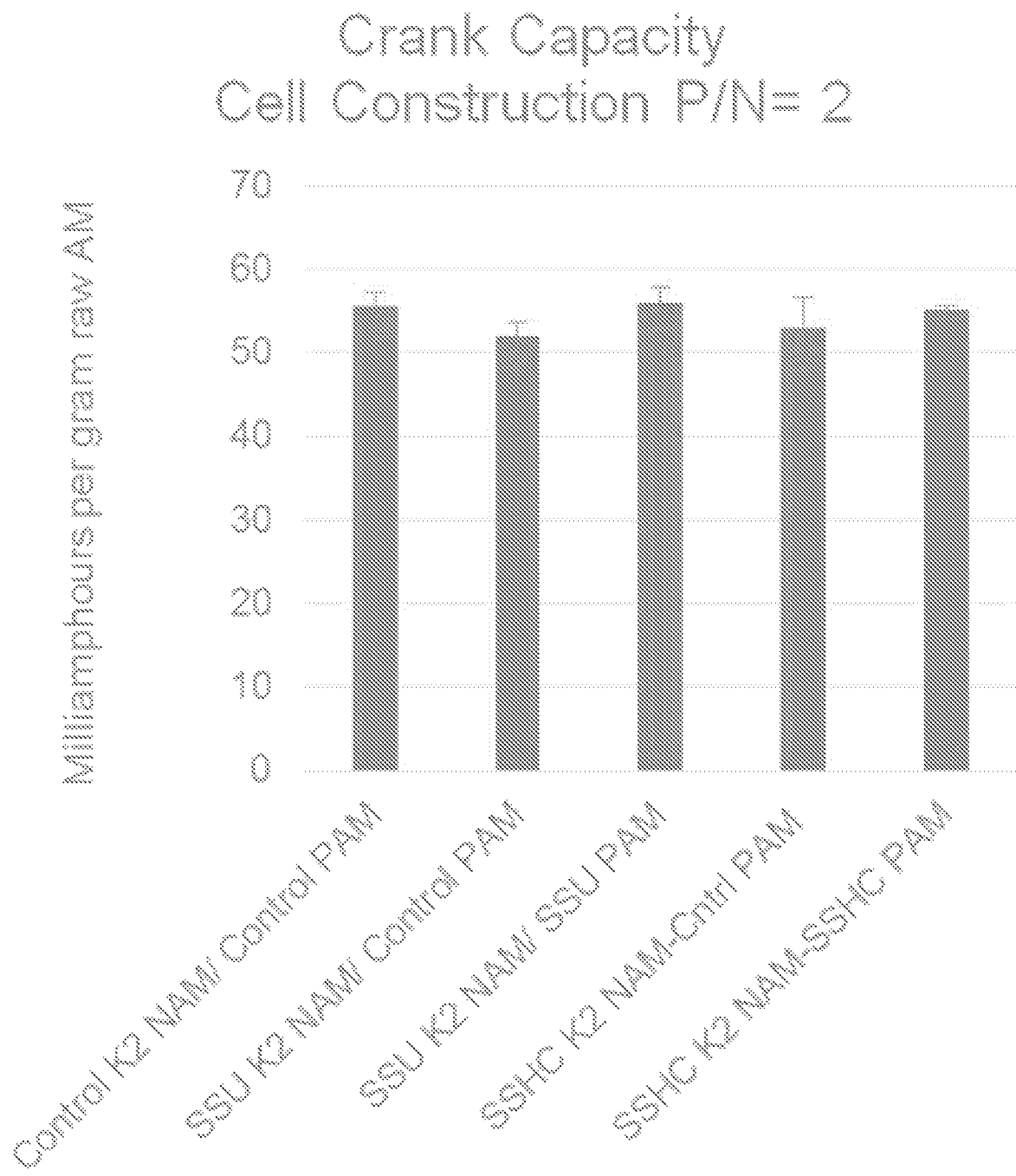

FIGS. 12A and 12B show crank capacity test results for seven cell types produced in accordance with Example 5:
(1) Control cells comprising positive plate electrodes produced using the conventional automotive battery leady oxide powder available from Hammond Group Inc., Hammond, Ind., USA, and negative plate electrodes produced using the conventional automotive battery leady oxide powder and the K2 additive package, both available from Hammond Group Inc., Hammond, Ind., USA (Control/Control);
(2) Comparative cells comprising positive plate electrodes produced using leady oxide powder produced from the ultra high purity secondary lead, and negative plate electrodes produced using the conventional automotive battery leady oxide powder and the K2 additive package, both available from Hammond Group Inc., Hammond, Ind., USA (SSU PAM/Control K2 NAM);
(3) Comparative cells comprising positive plate electrodes produced using the conventional automotive battery leady oxide powder available from Hammond Group Inc., Hammond, Ind., USA, and negative plate electrodes produced using leady oxide powder produced from the ultra high purity secondary lead and the K2 additive package available from Hammond Group Inc., Hammond, Ind., USA (Control PAM/SSU K2 NAM).
(4) Comparative cells comprising positive plate electrodes produced using leady oxide powder produced from the ultra high purity secondary lead, and negative plate electrodes produced using leady oxide powder produced from the ultra high purity secondary lead and the K2 additive package available from Hammond Group Inc., Hammond, Ind., USA (SSU/SSU);
(5) Experimental cells comprising positive plate electrodes produced in accordance with Example 3, and negative plate electrodes produced using the conventional automotive battery leady oxide powder and the K2 additive package, both available from Hammond Group Inc., Hammond, Ind., USA (SSHC PAM/Control K2 NAM);
(6) Experimental cells comprising positive plate electrodes produced using the conventional automotive battery leady oxide powder available from Hammond Group Inc., Hammond, Ind., USA, and negative plate electrodes produced in accordance with Example 4 with the K2 additive package available from Hammond Group Inc., Hammond, Ind., USA (Control PAM/SSHC K2 NAM); and
(7) Experimental cells comprising positive plate electrodes produced in accordance with Example 3, and negative plate electrodes produced in accordance with Example 4 with the K2 additive package available from Hammond Group Inc., Hammond, Ind., USA (SSHC PAM/SSHC K2 NAM).

FIG. 12A shows results for test cells having the positive plate electrode located in the central position and the two negative plate electrodes located in the peripheral position. FIG. 12B shows results for test cells having the negative plate electrode located in the central position and the two positive plate electrodes located in the peripheral position.

As shown in FIGS. 12A and 12B, the cell types exhibited comparable crank capacity performance. These results indicate that batteries comprising positive and/or negative plate electrodes produced using doped leady oxide powders produced from the lead-based alloys described in this specification will not exhibit any reduced crank capacity performance compared to batteries comprising conventional or ultra high purity active materials.

Example 7H: Float Current Test

Figure 13A:
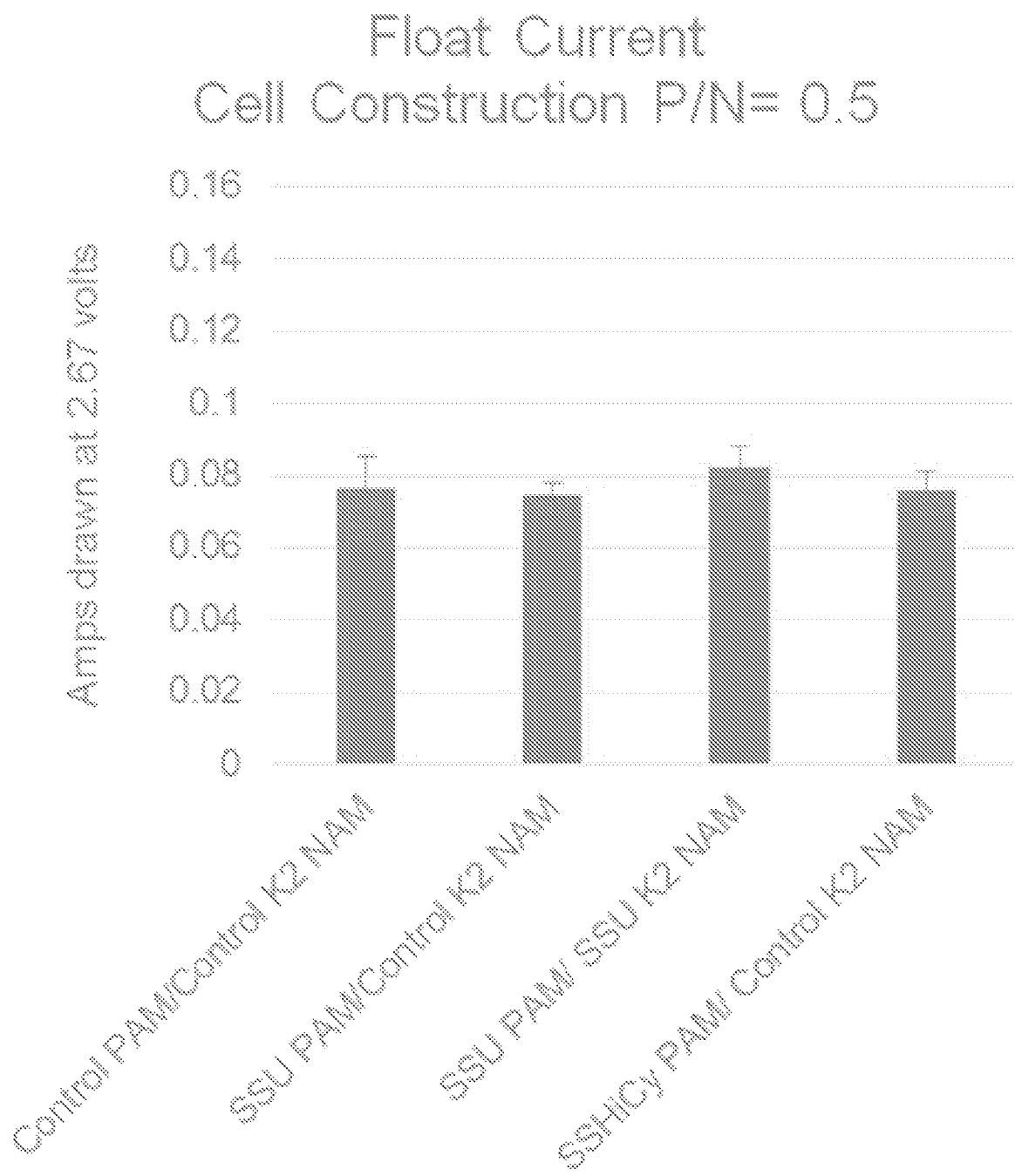
FIGS. 13A and 13B are bar graphs of float current test results for test cells comprising positive and/or negative plate electrodes produced using a doped leady oxide powder produced from the lead-based alloy described in this specification.
Figure 13B:
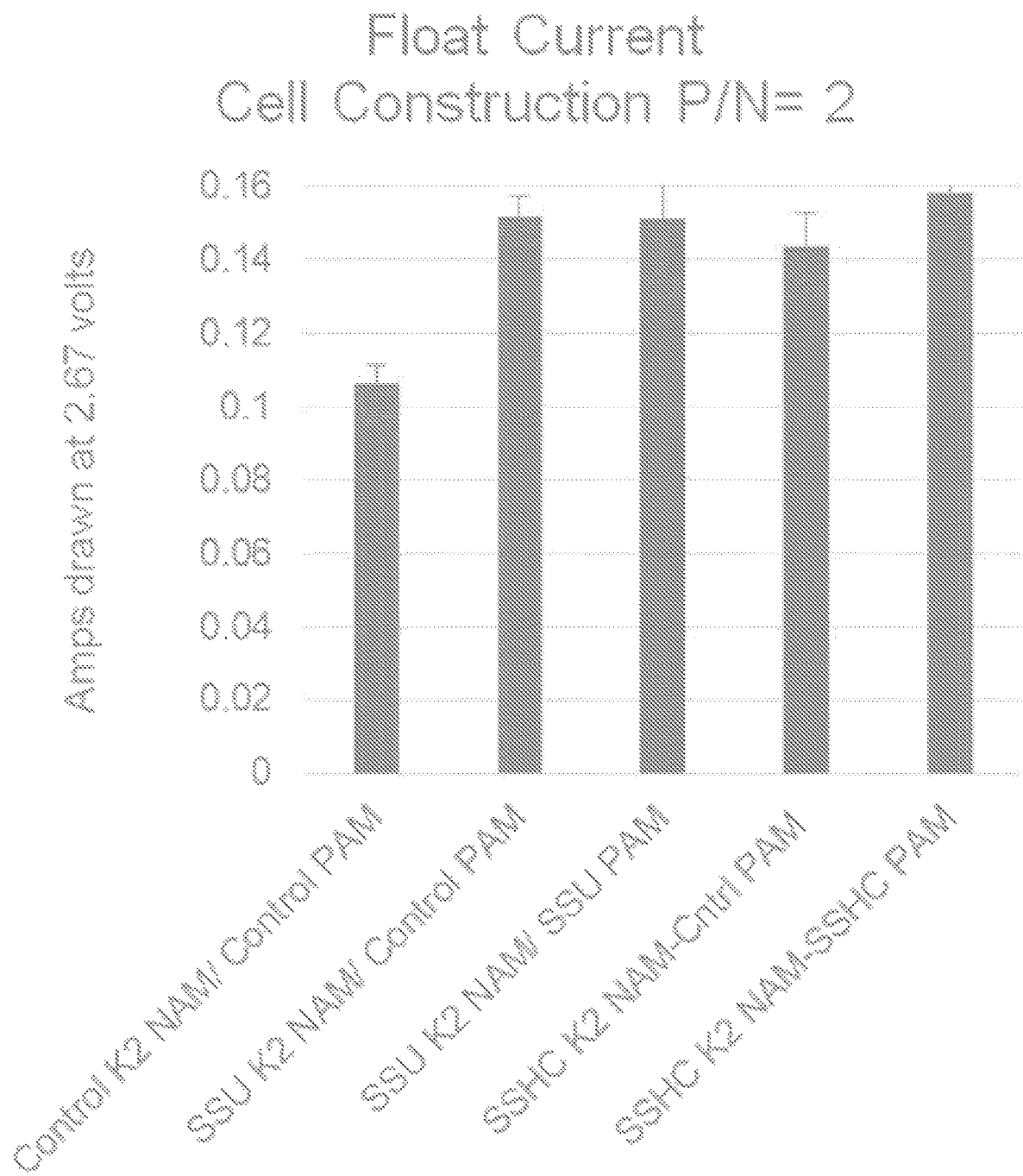

FIGS. 13A and 13B show float current test results for seven cell types produced in accordance with Example 5:
(1) Control cells comprising positive plate electrodes produced using the conventional automotive battery leady oxide powder available from Hammond Group Inc., Hammond, Ind., USA, and negative plate electrodes produced using the conventional automotive battery leady oxide powder and the K2 additive package, both available from Hammond Group Inc., Hammond, Ind., USA (Control/Control);
(2) Comparative cells comprising positive plate electrodes produced using leady oxide powder produced from the ultra high purity secondary lead, and negative plate electrodes produced using the conventional automotive battery leady oxide powder and the K2 additive package, both available from Hammond Group Inc., Hammond, Ind., USA (SSU PAM/Control K2 NAM);
(3) Comparative cells comprising positive plate electrodes produced using the conventional automotive battery leady oxide powder available from Hammond Group Inc., Hammond, Ind., USA, and negative plate electrodes produced using leady oxide powder produced from the ultra high purity secondary lead and the K2 additive package available from Hammond Group Inc., Hammond, Ind., USA (Control PAM/SSU K2 NAM).
(4) Comparative cells comprising positive plate electrodes produced using leady oxide powder produced from the ultra high purity secondary lead, and negative plate electrodes produced using leady oxide powder produced from the ultra high purity secondary lead and the K2 additive package available from Hammond Group Inc., Hammond, Ind., USA (SSU/SSU);
(5) Experimental cells comprising positive plate electrodes produced in accordance with Example 3, and negative plate electrodes produced using the conventional automotive battery leady oxide powder and the K2 additive package, both available from Hammond Group Inc., Hammond, Ind., USA (SSHC PAM/Control K2 NAM);
(6) Experimental cells comprising positive plate electrodes produced using the conventional automotive battery leady oxide powder available from Hammond Group Inc., Hammond, Ind., USA, and negative plate electrodes produced in accordance with Example 4 with the K2 additive package available from Hammond Group Inc., Hammond, Ind., USA (Control PAM/SSHC K2 NAM); and
(7) Experimental cells comprising positive plate electrodes produced in accordance with Example 3, and negative plate electrodes produced in accordance with Example 4 with the K2 additive package available from Hammond Group Inc., Hammond, Ind., USA (SSHC PAM/SSHC K2 NAM).

FIG. 13A shows results for test cells having the positive plate electrode located in the central position and the two negative plate electrodes located in the peripheral position. FIG. 13B shows results for test cells having the negative plate electrode located in the central position and the two positive plate electrodes located in the peripheral position.

As shown in FIGS. 13A and 13B, the cell types exhibited comparable float current performance. These results indicate that batteries comprising positive and/or negative plate electrodes produced using doped leady oxide powders produced from the lead-based alloys described in this specification will not exhibit any reduced float current performance compared to batteries comprising conventional or ultra high purity active materials.

Aspects of the Invention

Various aspects of the invention include, but are not limited to, the following numbered clauses.

1. A lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin.

2. The lead-based alloy of clause 1, further comprising up to 0.0500% silver.

3. The lead-based alloy of clause 1 or clause 2, further comprising up to 0.0100% thallium.

4. The lead-based alloy of any one of clauses 1-3, wherein the alloy contains: 0.0050% to 0.0700% bismuth; 0.0020% to 0.0200% antimony; 0.0020% to 0.0200% arsenic; 0.0010% to 0.0080% tin; up to 0.0500% silver; up to 0.100% thallium; and balance lead and incidental impurities.

5. The lead-based alloy of any one of clauses 1-4, wherein the alloy contains less than 0.0100 weight percent (100 ppm) of other elements.

6. The lead-based alloy of any one of clauses 1-5, wherein the alloy contains less than 0.0010 weight percent (10 ppm) of other elements.

7. The lead-based alloy of any one of clauses 1-6, wherein the alloy contains less than 0.0010 weight percent (10 ppm), in total, of tellurium, selenium, nickel, copper, molybdenum, manganese, cobalt, and chromium.

8. The lead-based alloy of any one of clauses 1-7, wherein the alloy contains less than 0.0001 weight percent (1 ppm), individually, of tellurium, selenium, nickel, copper, molybdenum, manganese, cobalt, and chromium.

9. The lead-based alloy of any one of clauses 1-8, wherein the alloy contains 0.0090% to 0.0600% bismuth.

10. The lead-based alloy of any one of clauses 1, wherein the alloy contains 0.0090% to 0.0150% bismuth.

11. The lead-based alloy of any one of clauses 1-10, wherein the alloy contains 0.0075% to 0.0125% antimony.

12. The lead-based alloy of any one of clauses 1-11, wherein the alloy contains 0.0090% to 0.0110% antimony.

13. The lead-based alloy of any one of clauses 1-12, wherein the alloy contains 0.0075% to 0.0125% arsenic.

14. The lead-based alloy of any one of clauses 1-13, wherein the alloy contains 0.0090% to 0.0110% arsenic.

15. The lead-based alloy of any one of clauses 1-14, wherein the alloy contains 0.0035% to 0.0060% tin.

16. The lead-based alloy of any one of clauses 1-15, wherein the alloy contains up to 0.0100% silver.

17. The lead-based alloy of any one of clauses 1-16, wherein the alloy contains up to 0.0050% silver.

18. The lead-based alloy of any one of clauses 1-17, wherein the alloy contains up to 0.0010% thallium.

19. The lead-based alloy of any one of clauses 1-18, wherein the alloy contains from 0.0001% to 0.0010% thallium.

20. The lead-based alloy of any one of clauses 1-19, wherein the alloy contains from 0.0001% to 0.0005% thallium.

21. The lead-based alloy of any one of clauses 1-18, wherein the alloy contains: 0.0090% to 0.0150% bismuth; 0.0090% to 0.0110% antimony; 0.0090% to 0.0110% arsenic; 0.0035% to 0.0060% tin; up to 0.0050% silver; and up to 0.0010% thallium.

22. A lead-based alloy comprising, in percent by total alloy weight: 0.0050% to 0.0700% bismuth; 0.0020% to 0.0200% antimony; 0.0020% to 0.0200% arsenic; 0.0010% to 0.0075% tin; up to 0.0100% silver; up to 0.0010% 5 thallium; and balance lead and incidental impurities.

23. The lead-based alloy of clause 22, wherein the alloy contains less than 0.0001 weight percent (1 ppm), individually, of tellurium, selenium, nickel, copper, molybdenum, manganese, cobalt, and chromium.

24. A lead-based alloy comprising, in percent by total alloy weight: 0.0090% to 0.0600% bismuth; 0.0075% to 0.0125% antimony; 0.0075% to 0.0125% arsenic; 0.0035% to 0.0060% tin; up to 0.0050% silver; up to 0.0010% thallium; and balance lead and incidental impurities; wherein the alloy contains less than 0.0001 weight percent (1 ppm), individually, of tellurium, selenium, nickel, copper, molybdenum, manganese, cobalt, and chromium.

25. A process for the production of doped leady oxide comprising: melting a lead-based alloy, wherein the lead-based alloy comprises, in percent by total alloy weight: 0.0030% to 0.0900% bismuth; 0.0010% to 0.0300% antimony; 0.0010% to 0.0300% arsenic; and 0.0010% to 0.0100% tin; atomizing the molten lead-based alloy to form molten lead-based alloy droplets; oxidizing the atomized molten lead-based alloy droplets; and solidifying the oxidized lead-based alloy droplets to form a doped leady oxide powder.

26. The process clause 25, wherein the lead-based alloy contains: 0.0050% to 0.0700% bismuth; 0.0020% to 0.0200% antimony; 0.0020% to 0.0200% arsenic; 0.0010% to 0.0075% tin; up to 0.0100% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

27. The process clause 25, wherein the lead-based alloy contains: 0.009% to 0.0600% bismuth; 0.0075% to 0.0125% antimony; 0.0075% to 0.0125% arsenic; 0.0035% to 0.0060% tin; up to 0.0050% silver; up to 0.0005% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

28. The process clause 25, wherein the lead-based alloy contains: 0.0090% to 0.0150% bismuth; 0.0090% to 0.0110% antimony; 0.0090% to 0.0110% arsenic; 0.0035% to 0.0060% tin; up to 0.0050% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

29. A process for the production of doped leady oxide comprising: charging lead-based alloy ingots into a ball mill, wherein the lead-based alloy comprises, in percent by total alloy weight: 0.0030% to 0.0900% bismuth; 0.0010% to 0.0300% antimony; 0.0010% to 0.0300% arsenic; and 0.0010% to 0.0100% tin; milling the lead-based alloy ingots in air; oxidizing the lead-based alloy during the milling to form doped leady oxide; and forming powder particles of the doped leady oxide during the milling.

30. The process clause 29, wherein the lead-based alloy contains: 0.0050% to 0.0700% bismuth; 0.0020% to 0.0200% antimony; 0.0020% to 0.0200% arsenic; 0.0010% to 0.0075% tin; up to 0.0100% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

31. The process clause 29, wherein the lead-based alloy contains: 0.0090% to 0.0600% bismuth; 0.0075% to 0.0125% antimony; 0.0075% to 0.0125% arsenic; 0.0035% to 0.0060% tin; up to 0.0050% silver; up to 0.0005% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

32. The process clause 29, wherein the lead-based alloy contains: 0.0090% to 0.0150% bismuth; 0.0090% to 0.0110% antimony; 0.0090% to 0.0110% arsenic; 0.0035% to 0.0060% tin; up to 0.0050% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

33. A doped leady oxide powder comprising an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin.

34. The doped leady oxide powder of clause 33, wherein the lead-based alloy contains: 0.0050% to 0.0700% bismuth; 0.0020% to 0.0200% antimony; 0.0020% to 0.0200% arsenic; 0.0010% to 0.0075% tin; up to 0.0100% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

35. The doped leady oxide powder of clause 33, wherein the lead-based alloy contains: 0.0090% to 0.0600% bismuth; 0.0075% to 0.0125% antimony; 0.0075% to 0.0125% arsenic; 0.0035% to 0.0060% tin; up to 0.0050% silver; up to 0.0005% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

36. The doped leady oxide powder of clause 33, wherein the lead-based alloy contains: 0.0090% to 0.0150% bismuth; 0.0090% to 0.0110% antimony; 0.0090% to 0.0110% arsenic; 0.0035% to 0.0060% tin; up to 0.0050% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

37. A process for the production of a lead-acid battery electrode comprising: mixing water and a doped leady oxide powder to produce an intermediate paste, wherein the doped leady oxide powder comprises an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin; and mixing aqueous sulfuric acid with the intermediate paste to produce an active material precursor paste.

38. The process of clause 37, further comprising mixing the water with the doped leady oxide and at least one additive selected from the group consisting of a lignosulfonate, barium sulfate, ammonium sulfate, magnesium sulfate, tetrabasic lead sulfate, tribasic lead sulfate, and carbon.

39. The process of clause 37 or clause 38, further comprising applying the active material precursor paste to a lead-based alloy grid to produce a plate.

40. The process of clause 39, further comprising exposing the plate to controlled temperature and relative humidity conditions for a period of time to cure the paste on the lead-based alloy grid and produce a cured plate.

41. The process of clause 40, further comprising passing an electrical current through the cured plate to electrochemically convert the cured paste into an active material comprising doped lead dioxide or spongy lead-based alloy, thereby forming the lead-acid battery electrode.

42. The process of clause 41, wherein the cured paste is electrochemically converted into a positive electrode active material comprising doped lead dioxide.

43. The process of clause 41, wherein the cured paste is electrochemically converted into a negative electrode active material comprising spongy lead-based alloy.

44. The process of any one of clauses 37-43, wherein the lead-based alloy that produces the doped leady oxide powder contains: 0.0050% to 0.0700% bismuth; 0.0020% to 0.0200% antimony; 0.0020% to 0.0200% arsenic; 0.0010% to 0.0075% tin; up to 0.0100% silver; up to 0.0010% thallium; and balance lead and incidental impurities; and wherein the lead-based alloy that produces the doped leady oxide powder contains less than 0.0001 weight percent (1 ppm), individually, of tellurium, selenium, nickel, copper, molybdenum, manganese, cobalt, and chromium.

45. The process of any one of clauses 37-44, wherein the lead-based alloy that produces the doped leady oxide powder contains: 0.0090% to 0.0600% bismuth; 0.0075% to 0.0125% antimony; 0.0075% to 0.0125% arsenic; 0.0035% to 0.0060% tin; up to 0.0050% silver; up to 0.0005% thallium; and balance lead and incidental impurities; and wherein the lead-based alloy that produces the doped leady oxide powder contains less than 0.0001 weight percent (1 ppm), individually, of tellurium, selenium, nickel, copper, molybdenum, manganese, cobalt, and chromium.

46. The process of any one of clauses 37-44, wherein the lead-based alloy that produces the doped leady oxide powder contains: 0.0090% to 0.0150% bismuth; 0.0090% to 0.0110% antimony; 0.0090% to 0.0110% arsenic; 0.0035% to 0.0060% tin; up to 0.0050% silver; up to 0.0010% thallium; and balance lead and incidental impurities; and wherein the lead-based alloy that produces the doped leady oxide powder contains less than 0.0001 weight percent (1 ppm), individually, of tellurium, selenium, nickel, copper, molybdenum, manganese, cobalt, and chromium.

47. A lead-acid battery electrode comprising: a lead-based alloy grid; and an active material located on the lead-based alloy grid, wherein the active material is formed from a doped leady oxide powder comprising an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin.

48. The lead-acid battery electrode of clause 47, wherein the lead-based alloy that produces the doped leady oxide powder contains: 0.0050% to 0.0700% bismuth; 0.0020% to 0.0200% antimony; 0.0020% to 0.0200% arsenic; 0.0010% to 0.0075% tin; up to 0.0100% silver; up to 0.0010% thallium; and balance lead and incidental impurities; and wherein the lead-based alloy that produces the doped leady oxide powder contains less than 0.0001 weight percent (1 ppm), individually, of tellurium, selenium, nickel, copper, molybdenum, manganese, cobalt, and chromium.

49. The lead-acid battery electrode of clause 47, wherein the lead-based alloy that produces the doped leady oxide powder contains: 0.0090% to 0.0600% bismuth; 0.0075% to 0.0125% antimony; 0.0075% to 0.0125% arsenic; 0.0035% to 0.0060% tin; up to 0.0050% silver; up to 0.0005% thallium; and balance lead and incidental impurities; and wherein the lead-based alloy that produces the doped leady oxide powder contains less than 0.0001 weight percent (1 ppm), individually, of tellurium, selenium, nickel, copper, molybdenum, manganese, cobalt, and chromium.

50. The lead-acid battery electrode of clause 47, wherein the lead-based alloy that produces the doped leady oxide powder contains: 0.0090% to 0.0150% bismuth; 0.0090% to 0.0110% antimony; 0.0090% to 0.0110% arsenic; 0.0035% to 0.0060% tin; up to 0.0050% silver; up to 0.0010% thallium; and balance lead and incidental impurities; and wherein the lead-based alloy that produces the doped leady oxide powder contains less than 0.0001 weight percent (1 ppm), individually, of tellurium, selenium, nickel, copper, molybdenum, manganese, cobalt, and chromium.

51. A process for the production of a lead-acid battery comprising: electrically interconnecting a plurality of electrodes to produce a cell, wherein the electrodes comprise an active material formed from a doped leady oxide powder comprising an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin; assembling at least one cell inside a casing; adding an aqueous sulfuric acid electrolyte into the casing and in contact with the plurality of electrodes; and sealing the casing.

52. The process of clause 51, wherein the lead-based alloy contains: 0.0050% to 0.0700% bismuth; 0.0020% to 0.0200% antimony; 0.0020% to 0.0200% arsenic; 0.0010% to 0.0075% tin; up to 0.0100% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

53. The process clause 51, wherein the lead-based alloy contains: 0.0090% to 0.0600% bismuth; 0.0075% to 0.0125% antimony; 0.0075% to 0.0125% arsenic; 0.0035% to 0.0060% tin; up to 0.0050% silver; up to 0.0005% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

54. The process clause 51, wherein the lead-based alloy contains: 0.0090% to 0.0150% bismuth; 0.0090% to 0.0110% antimony; 0.0090% to 0.0110% arsenic; 0.0035% to 0.0060% tin; up to 0.0050% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

55. A lead-acid battery comprising an electrode comprising an active material formed from a doped leady oxide powder comprising an oxidation product of a lead-based alloy comprising, in percent by total alloy weight: 0.0030% to 0.0900% bismuth; 0.0010% to 0.0300% antimony; 0.0010% to 0.0300% arsenic; and 0.0010% to 0.0100% tin.

56. The lead-acid battery of clause 55, wherein the lead-based alloy contains: 0.0050% to 0.0700% bismuth; 0.0020% to 0.0200% antimony; 0.0020% to 0.0200% arsenic; 0.0010% to 0.0075% tin; up to 0.0100% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

57. The lead-acid battery of clause 55, wherein the lead-based alloy contains: 0.0090% to 0.0600% bismuth; 0.0075% to 0.0125% antimony; 0.0075% to 0.0125% arsenic; 0.0035% to 0.0060% tin; up to 0.0050% silver; up to 0.0005% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

58. The lead-acid battery of clause 55, wherein the lead-based alloy contains: 0.0090% to 0.0150% bismuth; 0.0090% to 0.0110% antimony; 0.0090% to 0.0110% arsenic; 0.0035% to 0.0060% tin; up to 0.0050% silver; up to 0.0010% thallium; and balance lead and incidental impurities; and wherein the lead-based alloy contains less than 0.0001 weight percent (1 ppm), individually, of tellurium, selenium, nickel, copper, molybdenum, manganese, cobalt, and chromium.

Although the invention is described in this specification and claimed, at least in part, in the context of lead-acid batteries comprising pasted plate electrodes, it is understood that the invention is not necessarily limited to that context and is applicable to other types of lead-acid batteries such as, for example, lead-acid batteries comprising tubular electrodes.

Various features and characteristics of the invention are described in this specification and illustrated in the drawings to provide an overall understanding of the disclosed compositions, processes, and products. It is understood that the various features and characteristics described in this specification and illustrated in the drawings can be combined in any operable manner regardless of whether such features and characteristics are expressly described or illustrated in combination in this specification. The Inventors and the Applicant expressly intend such combinations of features and characteristics to be included within the scope of this specification, and further intend the claiming is such combinations of features and characteristics to not add matter to the application. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements (e.g., 35 U.S.C. § 112(a) and Article 123(2) EPC). The compositions, processes, and products described in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description and sufficiency of description requirements (e.g., 35 U.S.C. § 112(a) and Article 123(2) EPC). Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

Any patent, publication, or other document identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description and sufficiency of description requirements (e.g., 35 U.S.C. § 112(a) and Article 123(2) EPC).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

We claim:

1. A lead-based alloy comprising, in percent by total alloy weight:
   0.0090% to 0.0150% antimony;
   0.0010% to 0.0300% arsenic;
   0.0010% to 0.0090% tin; and
   balance lead and incidental impurities.

2. The lead-based alloy of claim 1, further comprising, in percent by total alloy weight, 0.0030% to 0.0900% bismuth.

3. The lead-based alloy of claim 1, further comprising, in percent by total alloy weight, up to 0.0010% silver.

4. The lead-based alloy of claim 1, further comprising, in percent by total alloy weight, up to 0.0010% thallium.

5. The lead-based alloy of claim 1, further comprising, in percent by total alloy weight, up to 0.0005% thallium.

6. The lead-based alloy of claim 1, wherein the alloy contains 0.0090% to 0.0150% arsenic, in percent by total alloy weight.

7. A process for the production of a lead-acid battery electrode, the process comprising:
   mixing water and a doped leady oxide powder to produce an intermediate paste, wherein the doped leady oxide powder comprises an oxidation product of a lead-based alloy comprising, in percent by total alloy weight:
      0.0090% to 0.0150% antimony;
      0.0010% to 0.0300% arsenic;
      0.0010% to 0.0090% tin; and
      balance lead and incidental impurities;
   mixing aqueous sulfuric acid with the intermediate paste to produce an active material precursor paste;
   applying the active material precursor paste to a lead-based alloy grid to produce a plate; and
   exposing the plate to controlled temperature and relative humidity conditions for a period of time to cure the paste on the lead-based alloy grid and produce a cured plate.

8. The process of claim 7, wherein the lead-based alloy comprises, in percent by total alloy weight, 0.0030% to 0.900% bismuth.

9. The process of claim 7, wherein the lead-based alloy comprises, in percent by total alloy weight, up to 0.0010% silver.

10. The process of claim 7, wherein the lead-based alloy comprises, in percent by total alloy weight, up to 0.0010% thallium.

11. The process of claim 7, wherein the lead-based alloy comprises, in percent by total alloy weight, up to 0.0005% thallium.

12. The process of claim 7, wherein the lead-based alloy comprises, in percent by total alloy weight, 0.0090% to 0.0150% arsenic.

13. A Process for the production of doped leady oxide, the process comprising:
   charging lead-based alloy ingots into a ball mill, wherein the lead-based alloy ingots comprise, in percent by total alloy weight:
      0.0090% to 0.0150% antimony;
      0.0010% to 0.0300% arsenic;
      0.0010% to 0.0090% tin; and
      balance lead and incidental impurities;
   milling the lead-based alloy ingots in air;
   oxidizing the lead-based alloy during the milling to form doped leady oxide; and forming powder particles of the doped leady oxidizing during the milling.

14. The process of claim 13, wherein the lead-based alloy comprises, in percent by total alloy weight, 0.0300% to 0.0900% bismuth.

15. The process of claim 13, wherein the lead-based alloy comprises, in percent by total alloy weight, up to 0.0100% silver.

16. The process of claim 13, wherein the lead-based alloy comprises, in percent by total alloy weight, up to 0.0010% thallium.

17. The process of claim 13, wherein the lead-based alloy comprises, in percent by total alloy weight, up to 0.0005% thallium.

18. The process of claim 13, wherein the lead-based alloy comprises, in percent by total alloy weight, 0.0090% to 0.0150% arsenic.

* * * * *